(12) United States Patent  
Miyata

(10) Patent No.: US 8,151,053 B2  
(45) Date of Patent: Apr. 3, 2012

(54) HIERARCHICAL STORAGE CONTROL APPARATUS, HIERARCHICAL STORAGE CONTROL SYSTEM, HIERARCHICAL STORAGE CONTROL METHOD, AND PROGRAM FOR CONTROLLING STORAGE APPARATUS HAVING HIERARCHICAL STRUCTURE

(75) Inventor: Michitaro Miyata, Tokyo (JP)

(73) Assignee: NEC Corporation, Tokyo (JP)

( * ) Notice: Subject to any disclaimer, the term of this patent is extended or adjusted under 35 U.S.C. 154(b) by 699 days.

(21) Appl. No.: 12/338,005

(22) Filed: Dec. 18, 2008

(65) Prior Publication Data

US 2009/0164721 A1 Jun. 25, 2009

(30) Foreign Application Priority Data

Dec. 19, 2007 (JP) ................................ 2007-326629

(51) Int. Cl.
*G06F 12/00* (2006.01)
*G06F 7/00* (2006.01)

(52) U.S. Cl. .................. 711/117; 711/122; 712/300

(58) Field of Classification Search .................. 711/117, 711/122; 712/300
See application file for complete search history.

(56) References Cited

U.S. PATENT DOCUMENTS 6,044,437 A * 3/2000 Reinders ....................... 711/122
6,535,584 B1 * 3/2003 Reinders ..................... 379/88.1

FOREIGN PATENT DOCUMENTS

| JP | 2005-338946 | 12/2005 |
|---|---|---|
| JP | 2007-041904 | 2/2007 |
| JP | 2007-183763 | 7/2007 |

OTHER PUBLICATIONS

"Computer World", Oct. 2007, IDG Japan, Oct. 1, 2007, pp. 98-103.

* cited by examiner

*Primary Examiner* — Kevin Ellis
*Assistant Examiner* — Mehdi Namazi
(74) *Attorney, Agent, or Firm* — Young & Thompson

(57) ABSTRACT

An extractor extracts a plurality of storage areas storing identical data strings therein from the storage areas of a lower storage layer. A layer storage controller associates the extracted storage areas with a single storage area of an upper storage layer.

10 Claims, 25 Drawing Sheets

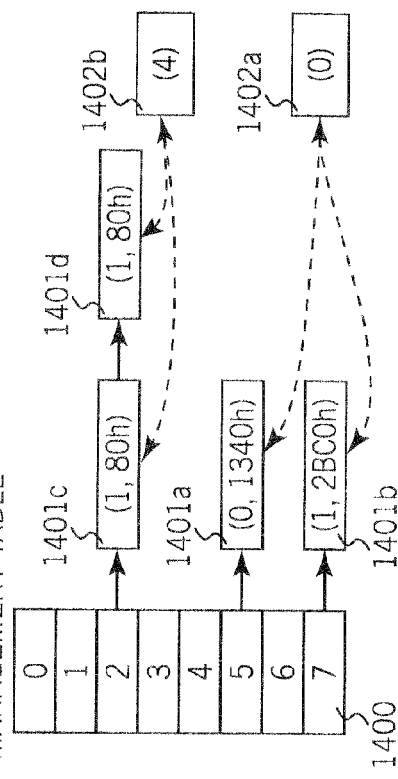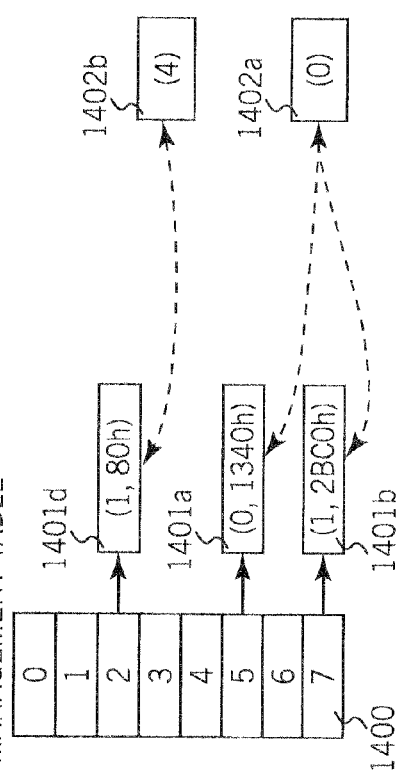
Fig. 20a, Fig. 20b, Fig. 20c, Fig. 20d

HIERARCHICAL STORAGE CONTROL APPARATUS, HIERARCHICAL STORAGE CONTROL SYSTEM, HIERARCHICAL STORAGE CONTROL METHOD, AND PROGRAM FOR CONTROLLING STORAGE APPARATUS HAVING HIERARCHICAL STRUCTURE

This application is based upon and claims the benefit of priority from Japanese patent application No. 2007-326629, filed on Dec. 19, 2007, the disclosure of which is incorporated herein in its entirety by reference.

BACKGROUND OF THE INVENTION

1. Field of the Invention

The present invention relates to a hierarchical storage control apparatus, a hierarchical storage control system, a hierarchical storage control method, and a program.

2. Description of the Related Art

Computer systems employ a hierarchical storage apparatus including an upper storage layer and a lower storage layer. The hierarchical storage apparatus employs a high-speed, small-capacity storage device as the upper storage layer and a low-speed, large-capacity storage device as the lower storage layer. The hierarchical storage apparatus combines accessibility and storage capacity at a relatively low cost based on the spatial and temporal locality of access to the storage devices.

For example, a cache is used as the upper storage layer, and a hard disk drive (HDD) as the lower storage layer. Since the cache is accessible faster than the HDD, the cache that is used as the upper storage layer is effective to hide the slow accessibility of the HDD.

When a storage apparatus incorporating a cache and an HDD receives a write command to write data from a host, the storage apparatus temporarily stores the requested data in the cache, and returns the write command to the host. Thereafter, the storage apparatus writes the data from the cache into the HDD. When the storage apparatus receives a read command to read data from the host, if the requested data are present in the cache, then the storage apparatus returns the requested data from the cache to the host. Since the storage apparatus does not need to read the data from the HDD, the slow accessibility of the HDD is concealed, and the accessibility of the storage apparatus is increased.

Generally, memory devices for use as caches have a higher price per capacity than HDDs. Therefore, caches should desirably have a high utilization efficiency. According to a proposed method of increasing the utilization efficiency of a cache, the cache is divided into a plurality of blocks, and duplicated caching is avoided in the blocks (Document 1 (see JP-A No. 2007-41904)).

Another storage apparatus includes an HDD whose storage area is divided into a plurality of blocks which have respective address spaces independently from each other. According to the SCSI (Small Computer System Interface) standards, the blocks are identified by LUNs (Logical Unit Numbers) that are identification numbers assigned to the respective blocks.

Generally, if the storage area of a storage apparatus includes a plurality of blocks, then the blocks may have the same data string. For example, if two hosts that operate under one operating system have respective system images stored in different blocks of one storage apparatus, then most of data strings regarding the operating system stored in those blocks are represented by the same data string.

On the other hand, one block may store duplicates of the same data string. This occurs when files of the same contents are present in different directories in a file system that is configured in one block.

To deal with such a problem, there is known a technology for increasing the efficiency with which to utilize the storage area of an HDD by storing only one data string in the HDD, e.g., a technology known as duplication (see, for example, Non-patent document 1, Monthly magazine "Computer World" October 2007, IDG Japan, Oct. 1, 2007, pp. 98-103).

According to duplicated caching, when data are stored in an HDD, it is determined whether the same data string is present at different addresses. If the same data string is present at different addresses, then only one data string is stored in the HDD.

However, since the HDD stores only one data string for different addresses according to duplicated caching, a fault on the HDD may result in a significant data loss. Furthermore, if information for managing the duplicated data is lost, then the information is highly difficult to recover. Therefore, it is desirable not to use the duplication from the standpoint of data availability.

According to duplicated caching, moreover, the speed for writing data is low because each time data are written, the data that have already been stored are checked to see if there are the same data string therein. It is thus desirable not to use the duplication for systems in which access rate is of importance.

However, without the duplicated caching being used, then if a plurality of identical data strings are stored in an HDD, the utilization efficiency of a cache associated with the HDD is lowered. As a result, the performance of the storage apparatus is lowered because one area in the cache corresponds to only one area in the HOD, possibly causing a plurality of identical data strings to be stored in the cache.

The above difficulty is not limited to the storage apparatus, but also applies to systems employing a general hierarchical storage apparatus. Specifically, as one area in the upper storage layer corresponds to only one area in the lower storage layer, when a plurality of identical data strings are present in the lower storage layer, a plurality of identical data strings may be present in the upper storage layer. Consequently, the utilization efficiency of the upper storage layer is lowered, causing a reduction in the system performance.

SUMMARY OF THE INVENTION

It is an object of the present invention to provide a hierarchical storage control apparatus, a hierarchical storage control system, a hierarchical storage control method, and a program which can increase the utilization efficiency of an upper storage layer.

According to an aspect of the present invention, a hierarchical storage control apparatus for controlling a storage apparatus having an upper storage layer and a lower storage layer comprises an extractor and a controller.

The extractor extracts a plurality of storage areas storing identical data strings therein from the lower storage layer.

The controller associates the storage areas extracted by the extractor with a single storage area of the upper storage layer.

According to another aspect of the present invention, a storage apparatus comprises the hierarchical storage control apparatus, the upper storage layer, and the lower storage layer.

According to still another aspect of the present invention, a hierarchical storage control system comprises the hierarchical storage control apparatus, the upper storage layer, the lower storage layer, and a main apparatus.

The main apparatus sends a write command for writing data into either one of the associated storage areas of the lower storage layer.

When the controller receives the write command from the main apparatus, the controller cancels the association between the storage areas of the lower storage layer and the storage area of the upper storage layer.

According to yet another aspect of the present invention, a method of controlling a storage apparatus having an upper storage layer and a lower storage layer comprises the steps of extracting a plurality of storage areas storing identical data strings therein from storage areas of the lower storage layer, and associating the extracted storage areas with a single storage area of the upper storage layer.

According to yet still another aspect of the present invention, a recording medium readable by a computer stores therein a program for enabling the computer which is connected to a storage apparatus having an upper storage layer and a lower storage layer, to perform a process of extracting a plurality of storage areas storing identical data strings therein from storage areas of the lower storage layer, and a process of associating the extracted storage areas with a single storage area of the upper storage layer.

According to the present invention, the utilization efficiency of the upper storage layer is increased.

The above and other objects, features, and advantages of the present invention will become apparent from the following description with reference to the accompanying drawings which illustrate examples of the present invention.

BRIEF DESCRIPTION OF THE DRAWINGS

FIG. 20a is a diagram showing an example of a data structure of a cache management information storage unit according to the first example of the pre-sent invention;

FIG. 20b is a diagram showing another example of the data structure of cache management information storage unit according to the first example of the present invention;

FIG. 20c is a diagram showing still another example of the data structure of cache management information storage unit according to the first example of the present invention;

FIG. 20d is a diagram showing yet another example of the data structure of cache management information storage unit according to the first example of the present invention;

DETAILED DESCRIPTION OF THE PREFERRED EMBODIMENTS

Figure 1:
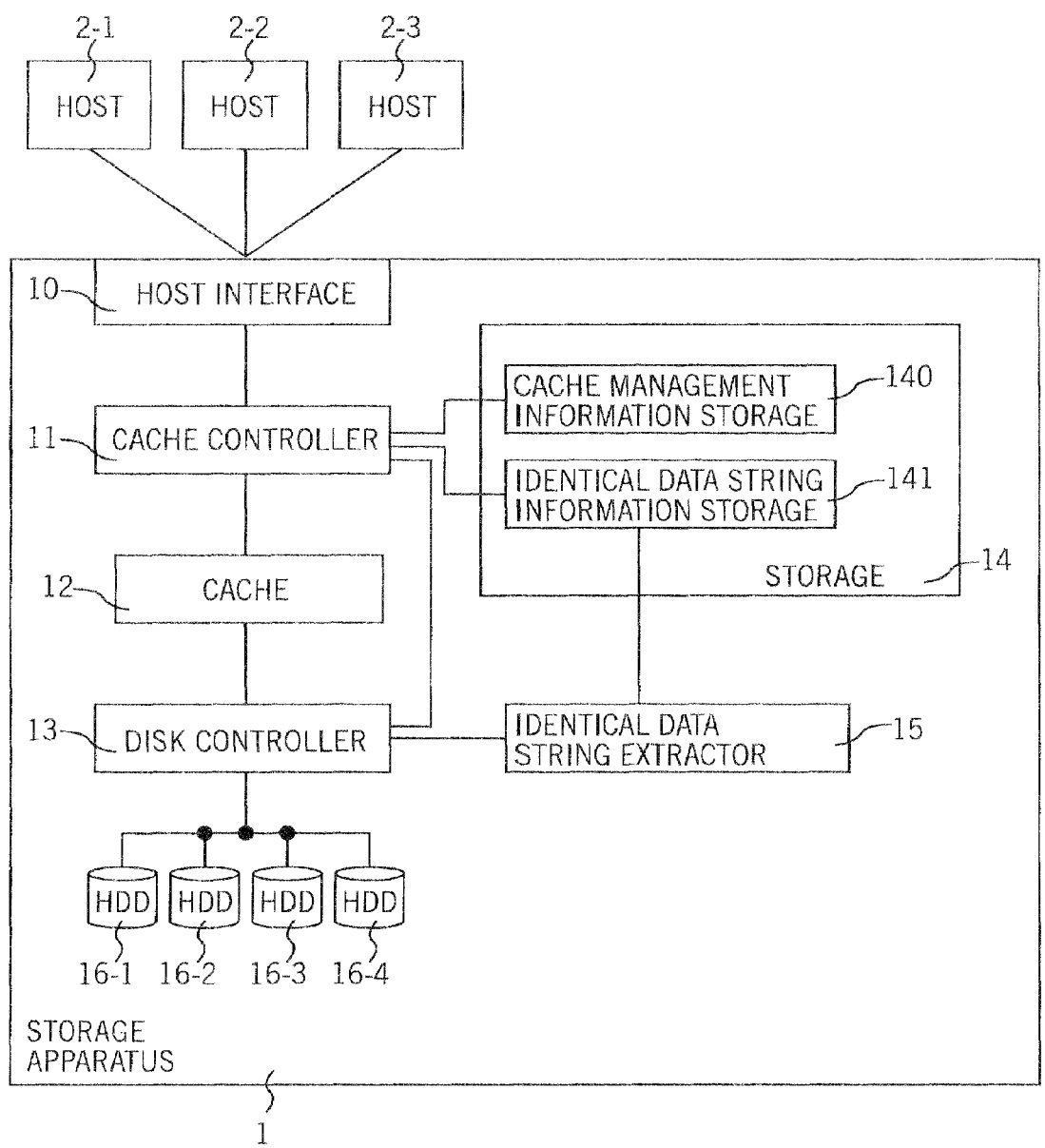
FIG. 1 is a block diagram showing the configuration of a hierarchical storage control system according to a first exemplary embodiment of the present invention.

Exemplary embodiments of the present invention will be described below with reference to the drawings, FIG. 1 is a block diagram showing the configuration of a hierarchical storage control system according to a first exemplary embodiment of the present invention. As shown in FIG. 1, the hierarchical storage control system comprises storage apparatus 1 and hosts 2-1, 2-2, 2-3.

Storage apparatus 1 comprises host interface 10, cache controller 11, cache (cache memory) 12, disk controller 13, storage 14, identical data string extractor 15, and HDDs (Hard Disk Drives) 16-1, 16-2, 16-3, 16-4. Host interface 10, cache controller 11, disk controller 13, storage 14, identical data string extractor 15 make up a hierarchical storage control apparatus. Hosts 2-1, 2-2, 2-3 represent an example of a main apparatus.

Host interface 10 sends and receives commands and data to and from hosts 2-1 through 2-3. Depending on the content of commands received from hosts 2-1 through 2-3 via host interface 10, cache controller 11 stores data received from hosts 2-1 through 2-3 into cache 12 and reads and sends data from cache 12 to hosts 2-1 through 2-3.

Cache 12 represents an example of an upper storage layer, and is a device having a data storage function. Cache 12 has a storage space divided into areas (storage areas) of fixed length referred to as pages which are individually managed. Disk controller 13 writes data into HDDs 16-1 through 16-4 and reads data from HDDs 16-1 through 16-4. HDDs 16-1 through 16-4 represent an example of a lower storage layer and are a devices having a data storage function. Storage 14 comprises cache management information storage 140 and identical data string information storage 141.

Cache management information storage 140 stores data (management information) representative of an association between the pages of cache 12 and the storage areas of HDDs 16-1 through 16-4. A data structure of cache management information storage 140 will be described later.

Identical data string information storage 141 stores data for associating different storage areas of HDDs 16-1 through 16-4 which have identical data strings. A data structure of identical data string information storage 141 will be described later.

Identical data string extractor 15 extracts a plurality of storage areas having identical data strings from the storage areas of HDDs 16-1 through 16-4 and stores information which identifies the extracted storage areas into identical data string information storage 141. HDDs 16-1 through 16-4 are devices having a data storage function, as described above. Although FIG. 1 shows four HDDs, the number of HDDs that can actually be used in the hierarchical storage control system is not limited.

Based on the information stored in identical data string information storage 141, cache controller 11 associates the storage areas of HDDs 16-1 through 16-4 that are identified by the information with one storage area of cache 12. Therefore, cache controller 11 associates the storage areas extracted by identical data string extractor 15 with the single storage area of cache 12.

Cache controller 11 stores associative information in cache management information storage 140.

The address space of the storage area of each of HDDs 16-1 through 16-4 is divided into a plurality of blocks which are identified by LUNs (Logical Unit Numbers). Positions in the blocks identified by LUNs are identified by LBAs (Local Block Addresses). Therefore, hosts 2-1 through 2-3 can uniquely access any particular position in HDDs 16-1 through 16-4 by specifying an LUN and an LBA as an address.

HDDs 16-1 through 16-4 may be in the form of RAIDs (Redundant Arrays of Independent Disks). If HDDs 16-1 through 16-4 comprise RAIDs, then disk controller 13 operates as a RAID controller.

According to the present exemplary embodiment, HDDs 16-1 through 16-4 store data of 512 bytes per LBA. Each page in cache 12 has a size of 32 kilobytes. Therefore, one page in cache 12 corresponds to a succession of 64 LBAs. The address of a storage area in an HDD which corresponds to one page is identified by an LUN and a beginning LBA.

Figure 2:
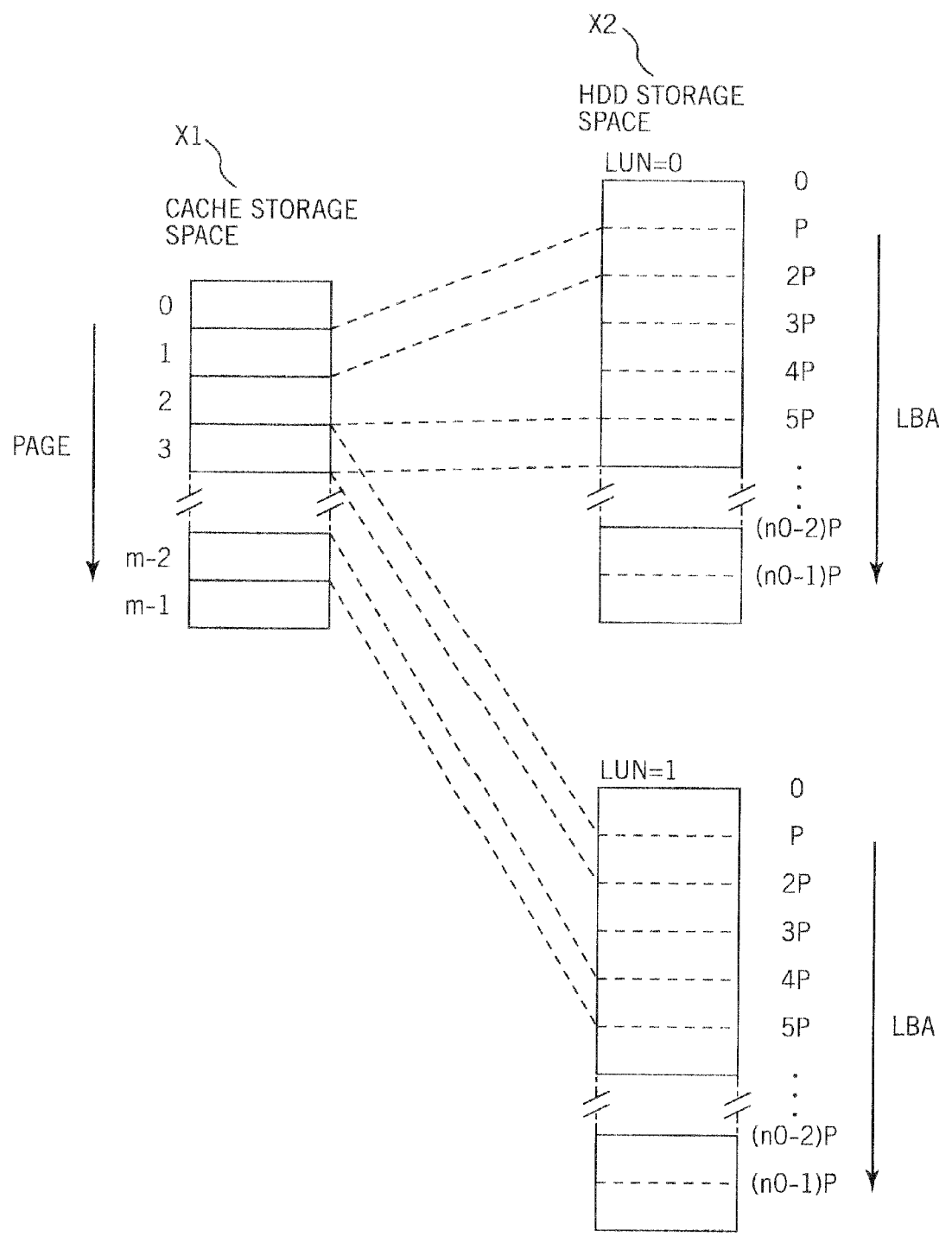
FIG. 2 is a diagram showing the concept of a storage space according to the first exemplary embodiment of the present invention.

FIG. 2 shows an association between the storage space of cache 12 and the storage space of an HDD. Specifically, FIG. 2 shows a storage space X1 of cache 12 and the storage space X2 of an HDD.

The storage space X1 of cache 12 contains m pages having 0 through (m−1) page numbers. The storage space X2 of an HOD are divided into two blocks represented by LUN=0, LUN=1. The block represented by LUN=0 has storage spaces whose LBAs range from 0 to $\{(n0-1) \Box P\}$, and the block represented by LUN=1 has storage spaces whose LBAs range from 0 to $\{(n1-1) \times P\}$ where P represents the number of LBAs corresponding to one page in the cache storage space. According to the present exemplary embodiment, the number of LBAs is P=64. n0 and n1 represent natural numbers representing values indicative of page numbers converted from the storage space LBA=0 and the storage space LBA=1, respectively.

In FIG. 2, the page indicated by the page number=1 in the cache storage space X1 is associated with LUN=0, LBA=P to (2P−1) in the HDD storage space X2. The page indicated by the page number=3 in the cache storage space X1 is associated with LUN=0, LBA=5P to (6P−1) and LUN=1, LBA=P to (2P−1) in HDD storage space X2. The page indicated by the page number=(m−2) in the cache storage space X1 is associated with LUN=1, LBA=4P through (5P−1) in the HDD storage space X2. The present exemplary embodiment is characterized in that one page in the cache storage space X1 is associated with a plurality of LUNs and LBAs in the HDD storage space X2.

Hosts 2-1 through 2-3 issue a data write command and a data write command to storage apparatus 1. Although FIG. 1 shows three hosts, the number of hosts that can actually be used in the hierarchical storage control system is not limited.

In FIG. 1, storage apparatus 1 and hosts 2-1 through 2-3 are directly connected to each other. However, they may be connected to each other through a SAN (Storage Area Network) using a protocol such as FC (Fibre Channel) or the like.

Figure 3:
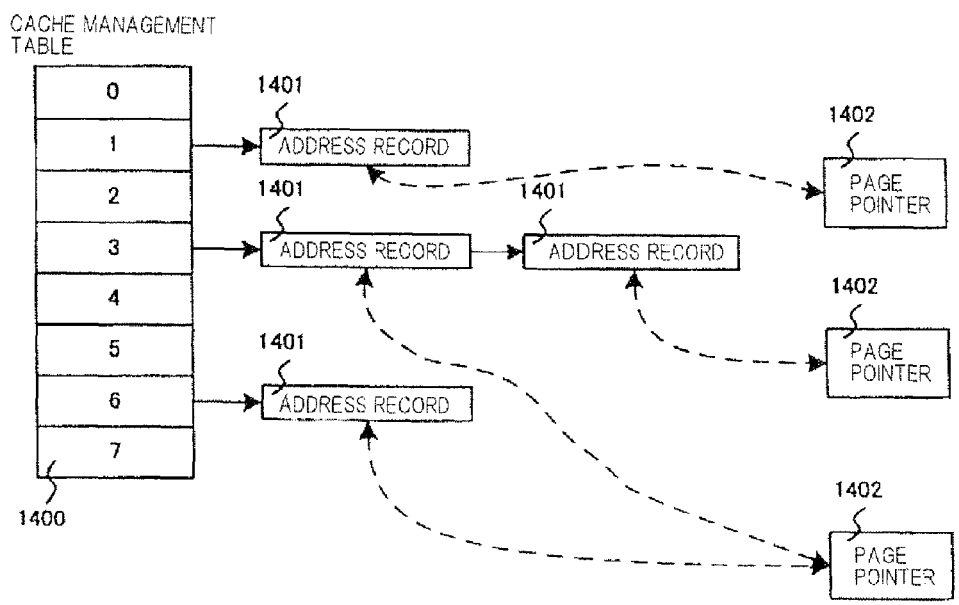
FIG. 3 is a diagram showing a portion of a data structure of cache management information storage unit according to the first exemplary embodiment of the present invention.

A data structure of cache management information storage 140 will be described below with reference to FIGS. 3 and 4. FIG. 3 is a diagram showing a portion of a data structure of cache management information storage 140, and FIG. 4 is a diagram showing a portion of the data structure of cache management information storage 140

Figure 4:
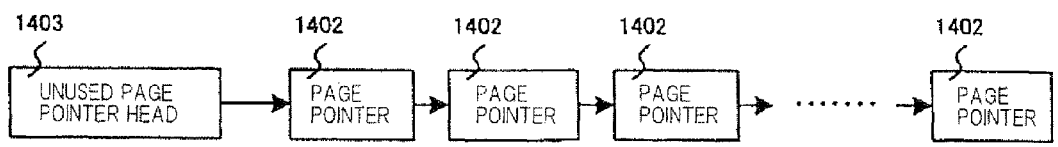
FIG. 4 is a diagram showing a portion of the data structure of cache management information storage unit according to the first exemplary embodiment of the present invention.

As shown in FIGS. 3 and 4, cache management information storage 140 includes cache management table 1400, address records 1401, page pointers 1402, and unused page pointer head 103.

Cache management table 1400 is a table for looking for address record 1401 corresponding to a desired address. Cache management table 1400 includes a plurality of columns each having an identification number and a pointer for address record 1401. According to the present exemplary embodiment, cache management table 1400 includes eight columns having respective identification numbers ranging from 0 to 7.

Each address record 1401 has an LUN and an LBA as address information, and a pointer for another address record

1401 and a pointer for page pointer 1402. The address information of each address record 1401 represents the beginning address of a storage space in an HDD which is associated with a page.

Each page pointer 1402 has a pointer for a page in cache 12, a pointer for address record 1401, and a pointer for another page pointer 1402. The number of page pointers 1402 is the same as the number of pages in the storage space of cache 12. Each page pointer 1402 may have a plurality of pointers for address records 1401. Unused page pointer head 1403 has a pointer for page pointer 1402.

Each address record 1401 has a unidirectional joint list structure wherein a column of cache management table 1400 serves as a head. Each address record 1401 is connected to a list with the head represented by the column of cache management table 1400 which has the same identification number as a hash value that is calculated from the address information of address record 1401.

According to the present exemplary embodiment, the hash value comprises a value which produces a remainder of 8 with respect to a value produced by dividing the LBA of address information by the number P of LBAs corresponding to one page. For example, the hash value of address record 1401 having LUN=0, LBA=18P as address information is a value which produces a remainder of 8 with respect to (18P)/P=18, i.e., 2. In this case, address record 1401 is connected to the column having two identifiers among the columns of cache management table 1400.

Address records 1401 and page pointers 1402 are associated with each other by a many-to-one bidirectional link. Specifically, one address record 1401 can be linked to only one page pointer 1402, and one page pointer 1402 can be linked from a plurality of address records 1401.

Furthermore, one page pointer 1402 can be linked to a plurality of address records 1401, and one address record 1401 can be linked from only one page pointer 1402. With respect to page pointer 1402 linked from address record 1401, a pointer for another page pointer 1402 is unused.

Page pointer 1402 that has no link to address records 1401 has a unidirectional joint list structure wherein unused page pointer head 1403 serves as a head. With respect to page pointer 1402 connected to a list wherein unused page pointer head 1403 serves as a head, the pointer for address record 1401 is unused.

Figure 5:
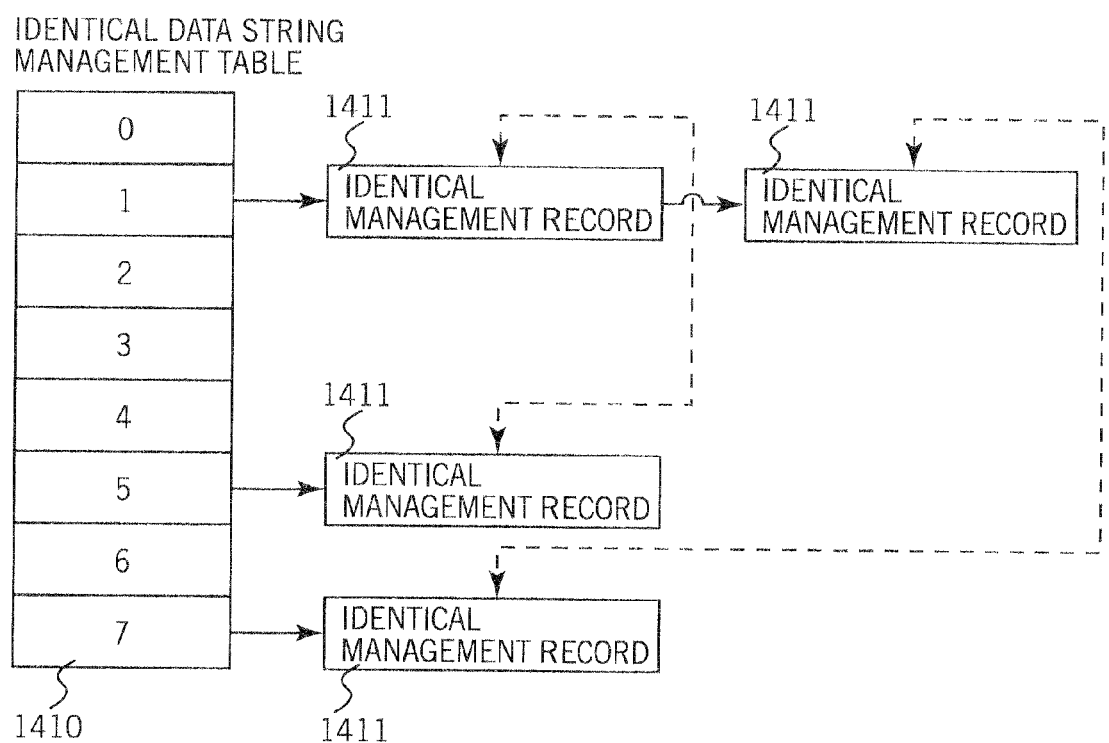
FIG. 5 is a diagram showing a data structure of an identical data string information unit storage according to the first exemplary embodiment of the present invention.

A data structure of identical data string information storage 141 will be described below with reference to FIG. 5. FIG. 5 is a diagram showing a data structure of identical data string information storage 141.

As shown in FIG. 5, identical data string information storage 141 comprises identical data string management table 1410 and identical management records 1411. Identical data string management table 1410 is a table for looking for identical management record 1411 corresponding to a desired address.

Identical data string management table 1410 includes a plurality of columns each having an identification number and a pointer for identical management record 1411. According to the present exemplary embodiment, identical data string management table 1410 includes eight columns having respective identification numbers ranging from 0 to 7.

Each identical management record 1411 has an LUN and an LBA as address information, and a pointer for another identical management record 1411. Each identical management record 1411 may have a plurality of pointers for other identical management records 1411. Each identical management record 1411 has a unidirectional joint list structure wherein a column of identical data string management table 1410 serves as a head.

Each identical management record 1411 is associated with one or more identical management records 1411 by a bidirectional link. Each identical management record 1411 is connected to a list with the head represented by the column of identical data string management table 1410 which has the same identification number as a hash value that is calculated from the address information of identical management record 1411.

According to the present exemplary embodiment, the hash value comprises a value which produces a remainder of 8 with respect to a value produced by dividing the LBA of address information by the number P of LBAs corresponding to one page. For example, the hash value of identical management record 1411 having LUN=0, LBA=18P as address information is a value which produces a remainder of 8 with respect to (18P)/P=18, i.e., 2. In this case, identical management record 1411 is connected to the column having two identifiers among the columns of identical data string management table 1410.

Operation of the hierarchical storage control system will be described below.

Figure 6:
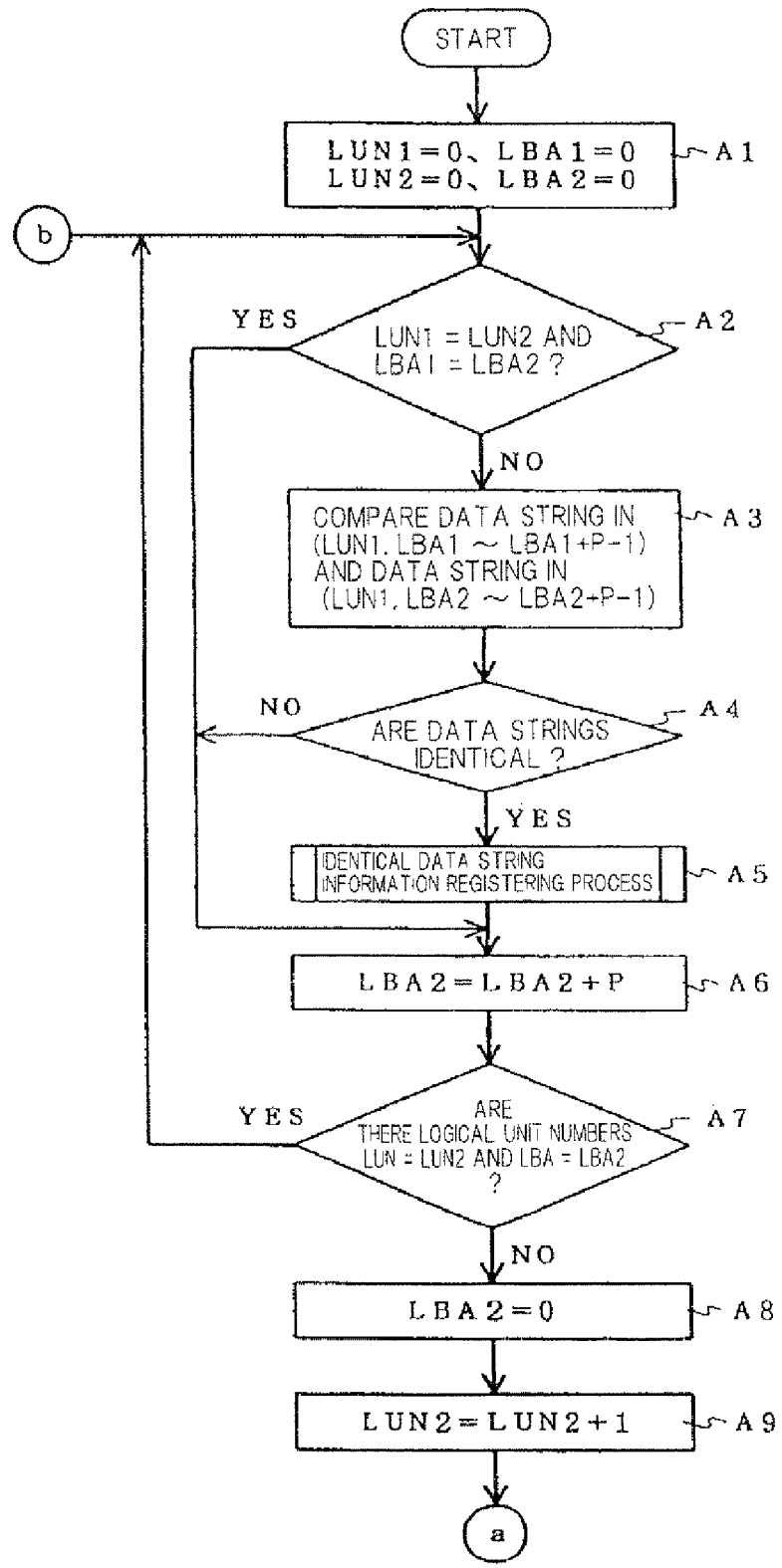
FIG. 6 is a flowchart of an identical data string extracting process according to the first exemplary embodiment of the present invention.
Figure 7:
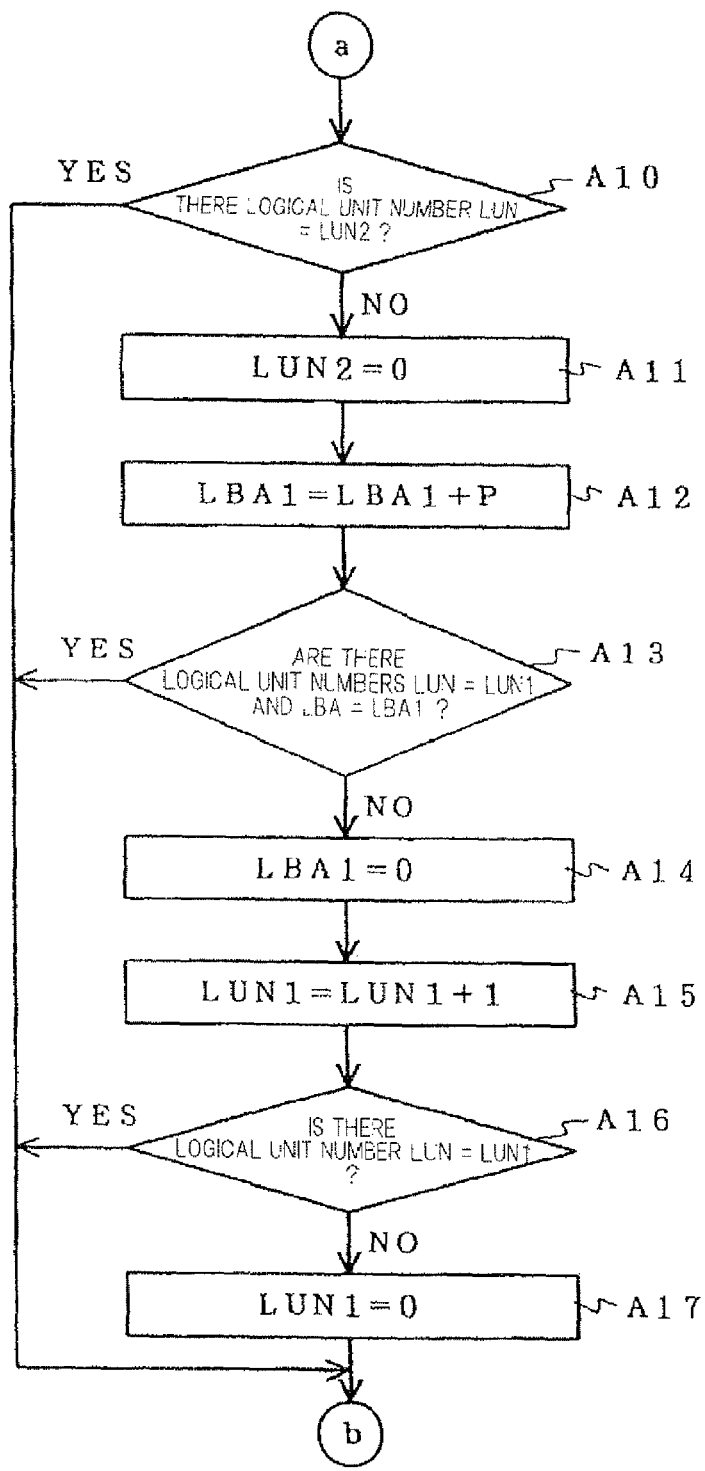
FIG. 7 is a flowchart of the identical data string extracting process according to the first exemplary embodiment of the present invention.
Figure 8:
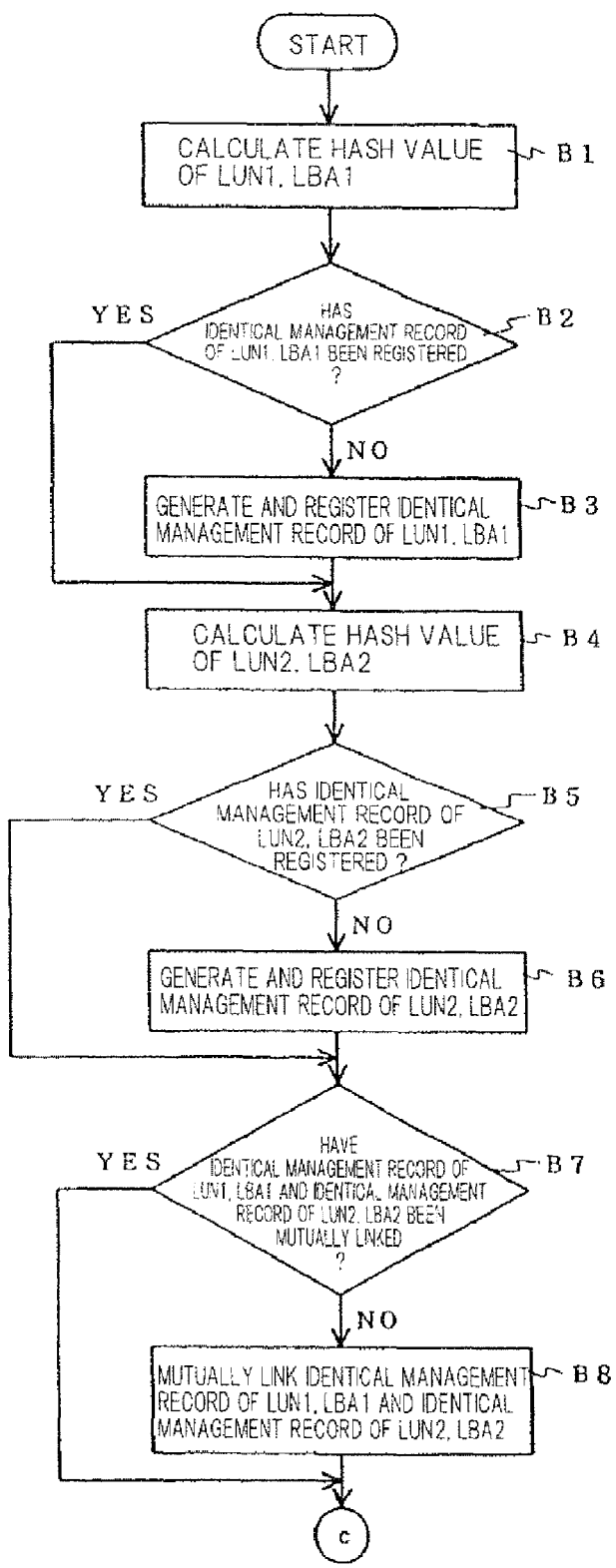
FIG. 8 is a flowchart of an identical data string information registering process according to the first exemplary embodiment of the present invention.
Figure 9:
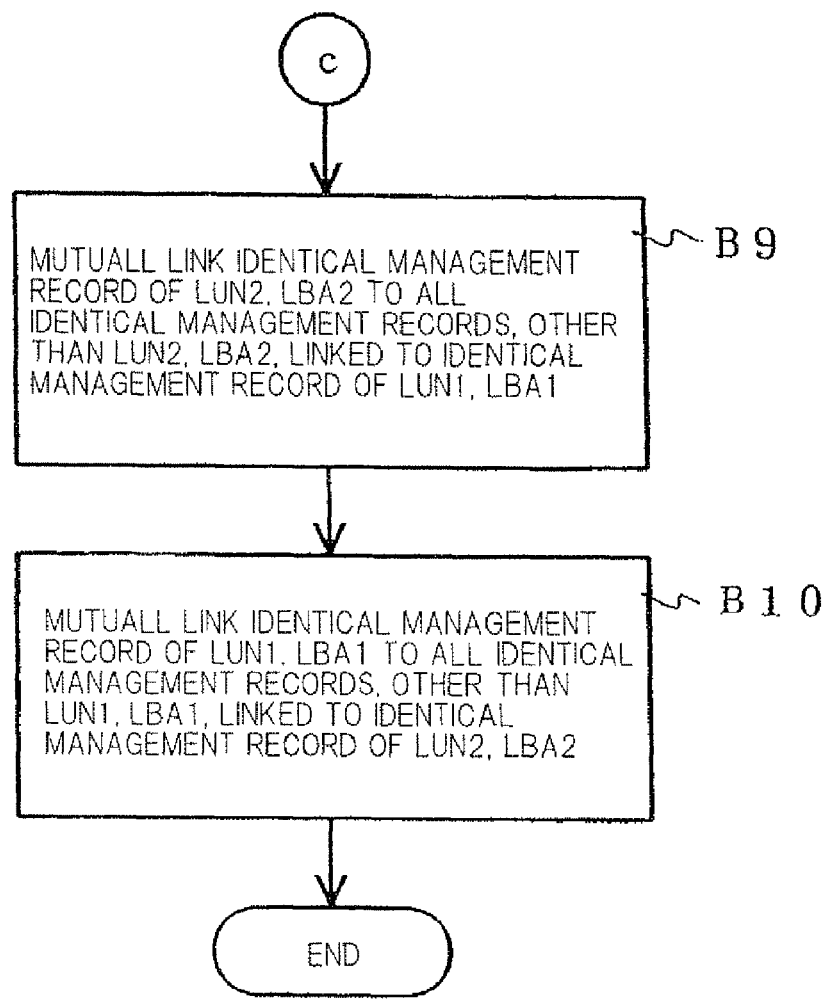
FIG. 9 is a flowchart of the identical data string information registering process according to the first exemplary embodiment of the present invention.
Figure 10:
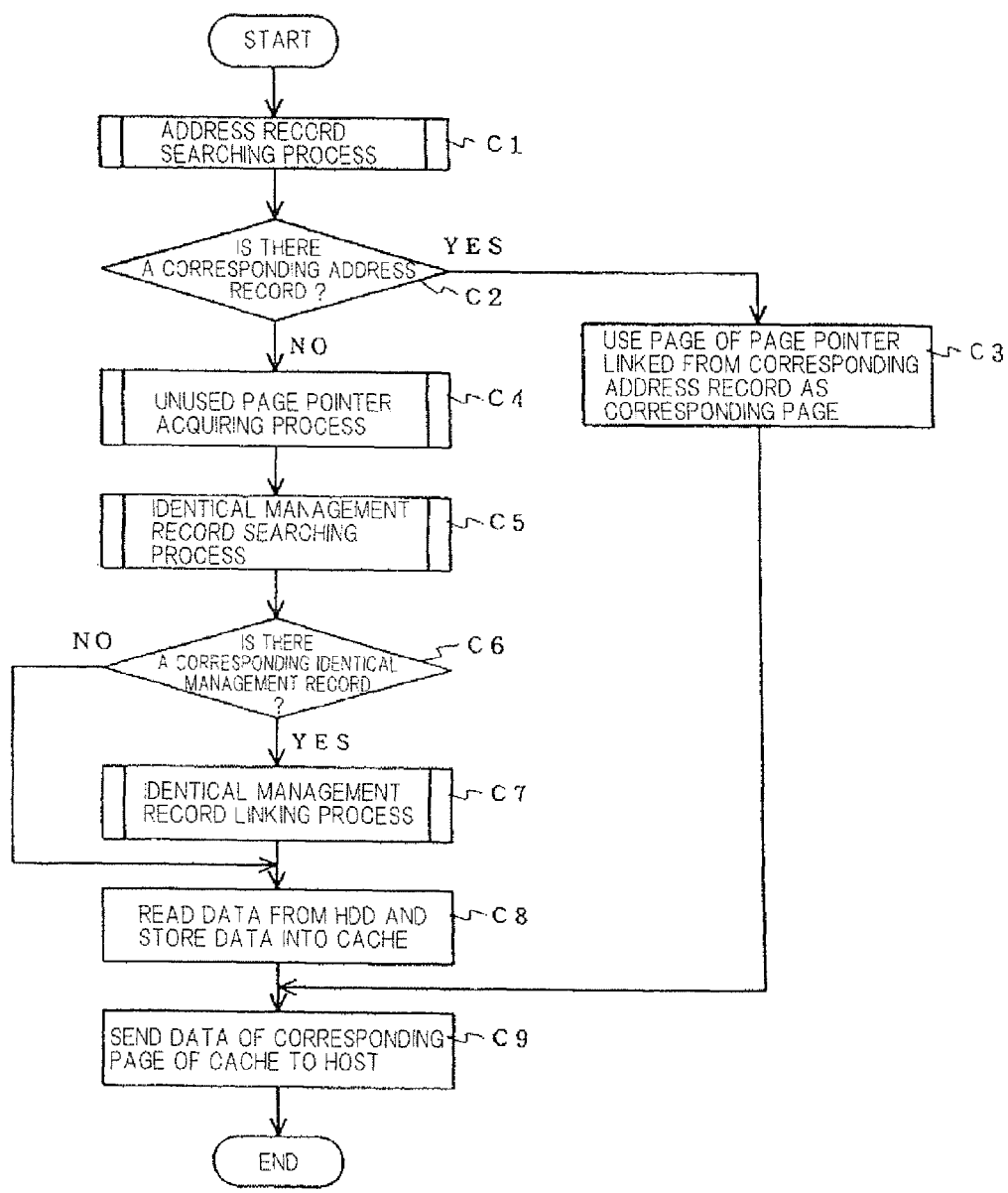
FIG. 10 is a flowchart of a reading process according to the first exemplary embodiment of the present invention.
Figure 11:
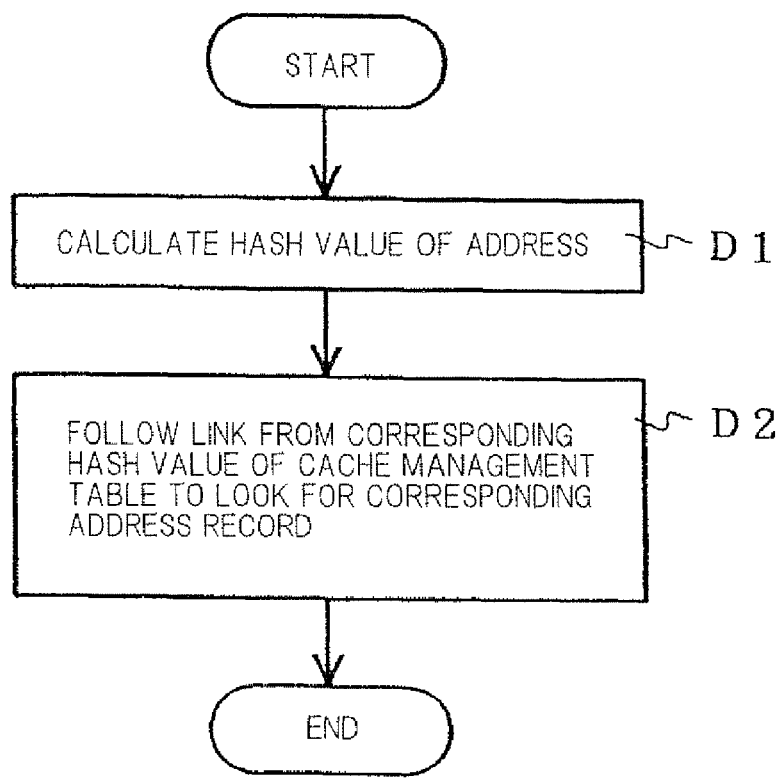
FIG. 11 is a flowchart of an address record searching process according to the first exemplary embodiment of the present invention.

FIGS. 6 and 7 are a flowchart of an identical data string extracting process, and FIGS. 8 and 9 are a flowchart of an identical data string information registering process. FIG. 10 is a flowchart of a reading process, and FIG. 11 is a flowchart of an address record searching process.

Figure 12:
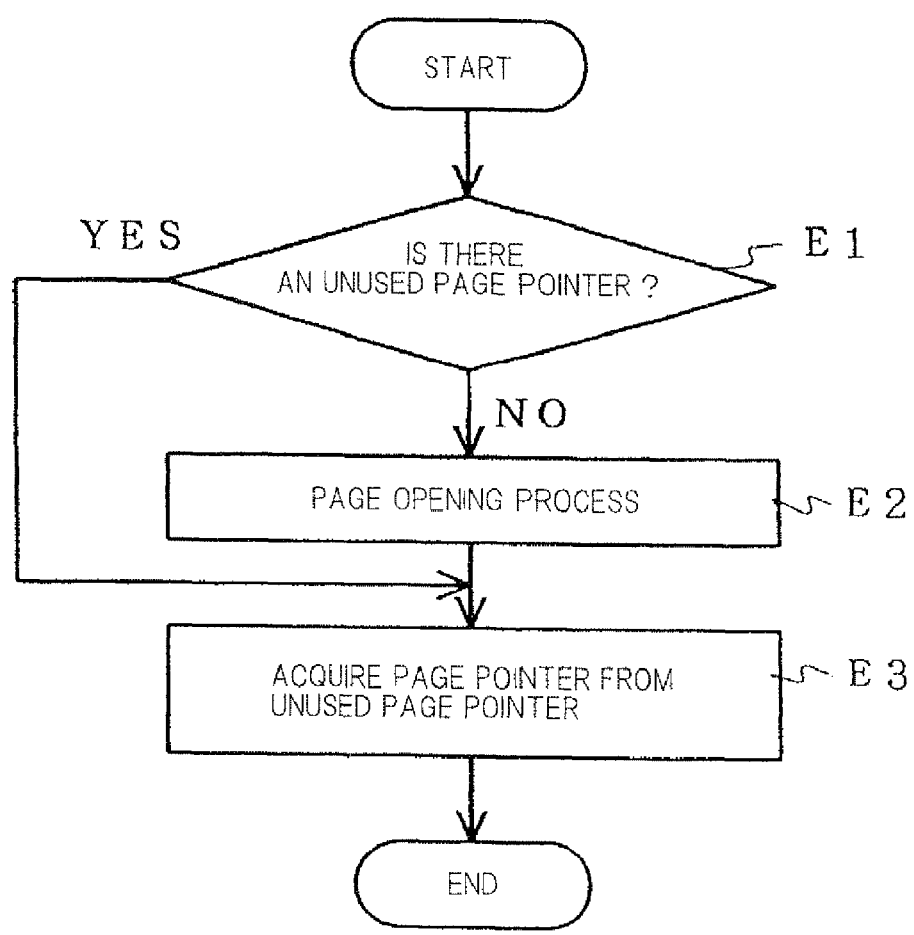
FIG. 12 is a flowchart of an unused page pointer acquiring process according to the first exemplary embodiment of the present invention.
Figure 13:
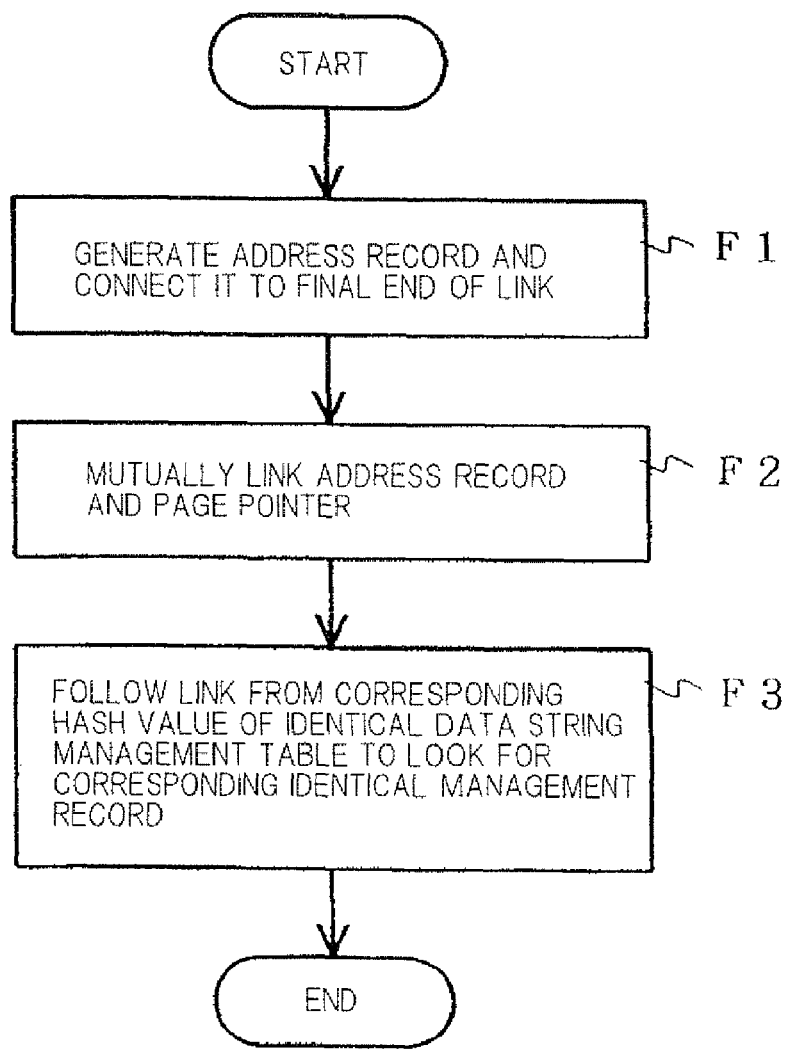
FIG. 13 is a flowchart of an identical management record searching process according to the first exemplary embodiment of the present invention.
Figure 14:
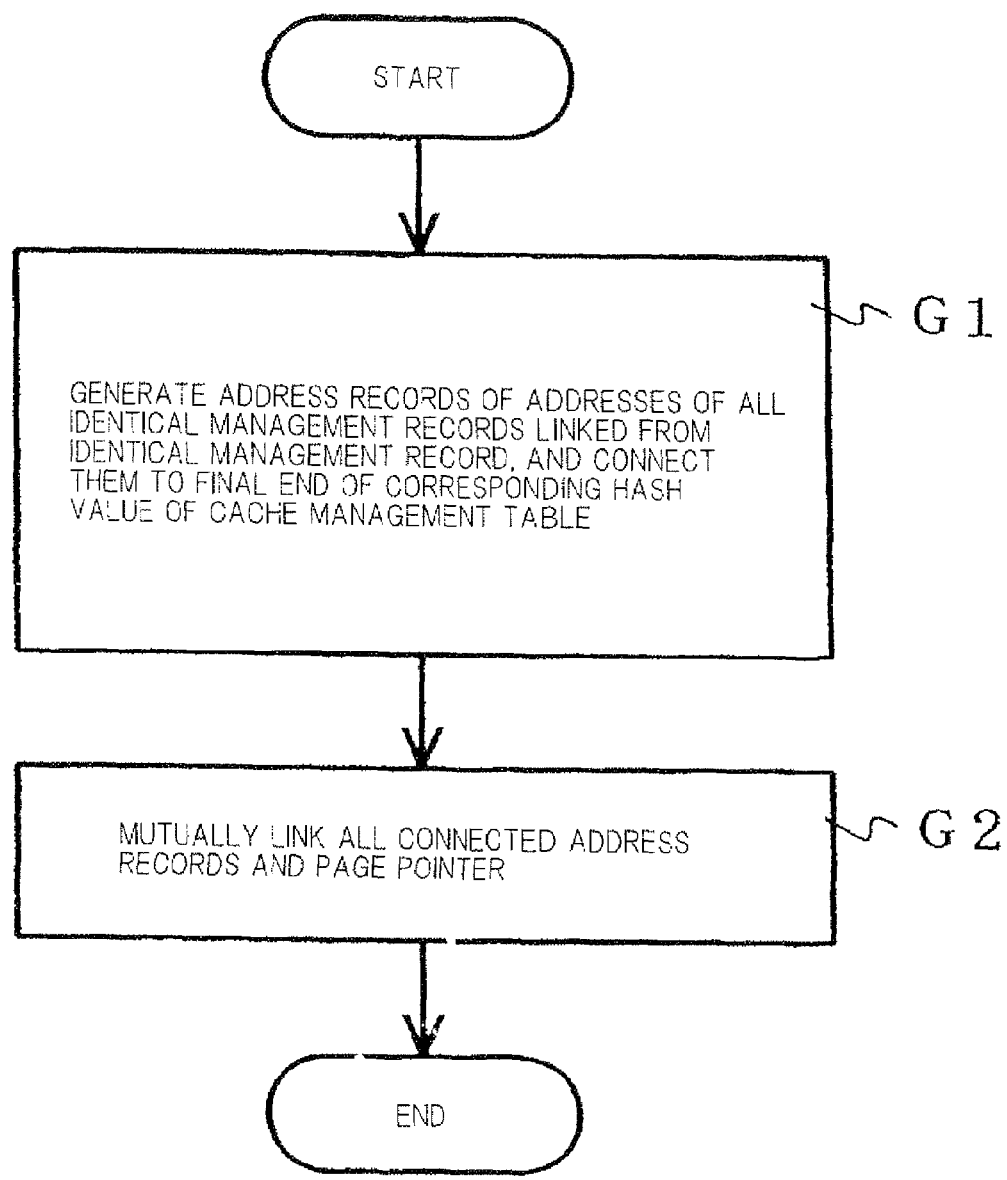
FIG. 14 is a flowchart of an identical management record linking process according to the first exemplary embodiment of the present invention.
Figure 15:
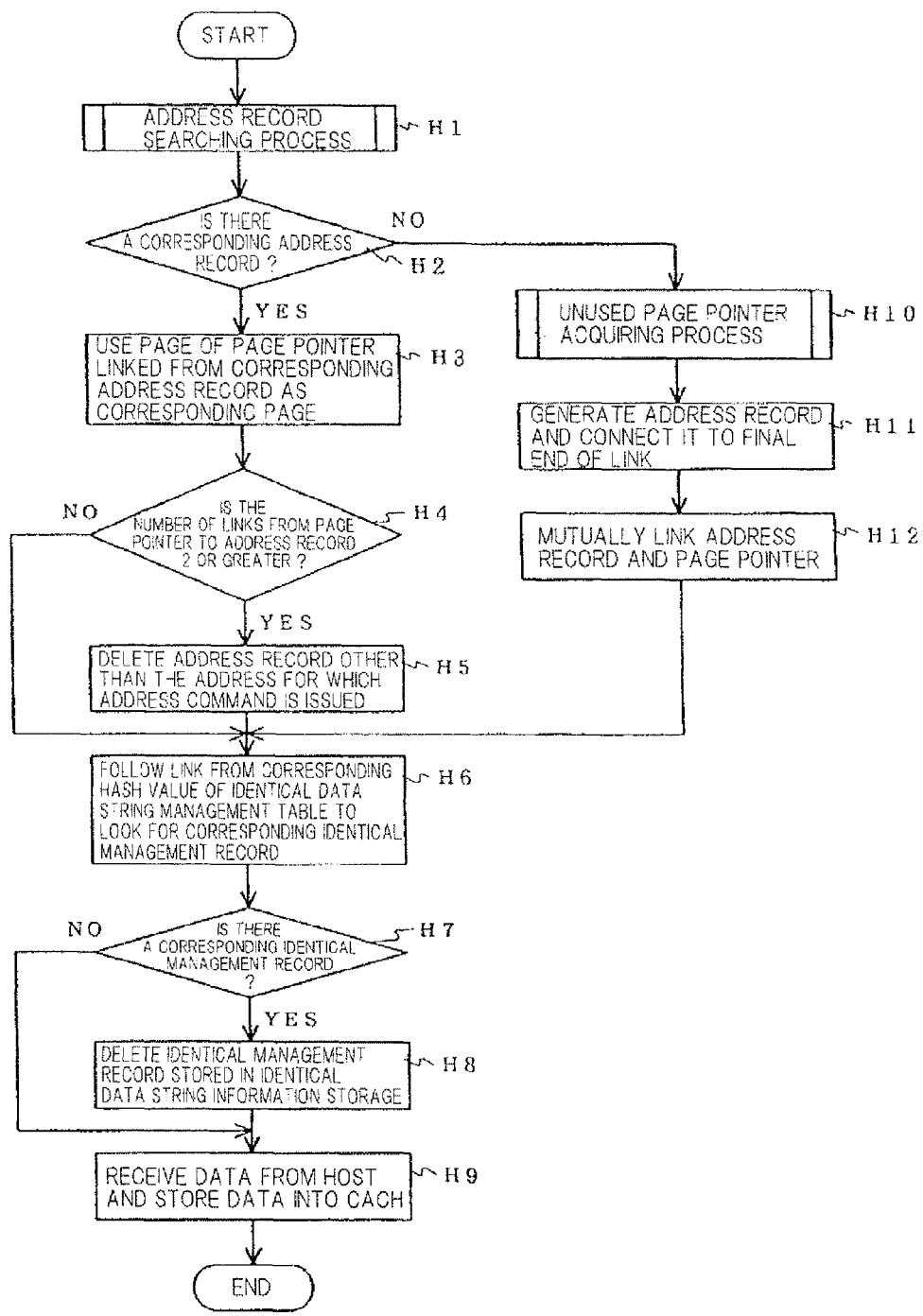
FIG. 15 is a flowchart of a writing process according to the first exemplary embodiment of the present invention.

FIG. 12 is a flowchart of an unused page pointer acquiring process, and FIG. 13 is a flowchart of an identical management record searching process. FIG. 14 is a flowchart of an identical management record linking process, and FIG. 15 is a flowchart of a writing process.

It is assumed for the sake of brevity that LBAs which are specified by a read command and a write command are only LBAs at the beginnings of pages to be allocated, and that the length of data read or written by one command is equal to one page. However, the present invention is not limited to such details, but can easily be applied to general conditions. The processing sequences shown in FIGS. 6 through 15 can be implemented by having a computer, not shown, such as a CPU or the like in storage apparatus 1 execute corresponding programs.

First, the operation of the hierarchical storage control apparatus at the time that storage apparatus 1 has not received a read command and a write command from hosts 2-1 through 2-3 (hereinafter referred to as "host 2") will be described below. At this time, identical data extractor 15 searches HDDs 16-1 through 16-4 (hereinafter referred to as "HDD 16") for identical data strings and registers the identical data strings in identical data string information storage 141. Such a process will be described below with reference to FIGS. 6 through 9.

Identical data extractor 15 has LUN1, LBA1, LUN2, LBA2 as variables for performing the process. The values of LUNs are put in LUN1, LUN2, and the values of LBAs are put in LBA1, LBA2. According to the present exemplary embodiment, one or more LUNs are defined, and successive values ranging from 0 are assigned to LUNs. Each LUN has an LBA corresponding to one page or more.

First, identical data extractor 15 puts 0 in all of LUN1, LBA1, LUN2, LBA2 (step A1 in FIG. 6). Then, identical data extractor 15 determines whether LUN1=LUN2 and LBA1=LBA2 or not (step A2 in FIG. 6). If LUN1=LUN2 and LBA1=LBA2, then identical data extractor 15 performs step A6 described later.

If LUN1≠LUN2 or LBA1≠LBA2, then identical data extractor 15 compares the contents of a data string stored in LUN1 from LBA1 to LBA1+P−1 with the contents of a data string stored in LUN2 from LBA2 to LBA2+P−1 (step A3 in FIG. 6). If the data strings are identical to each other (step A4, YES, in FIG. 6), then identical data extractor 15 performs the identical data string information registering process (step A5 in FIG. 6). Details of the identical data string information registering process will be described later.

If LUN1=LUN2 and LBA1=LBA2 (step A2, YES, in FIG. 6), or if the data strings compared in step A3 are different from each other (step A4, NO, in FIG. 6), or after the identical data string information registering process is performed in step A5 in FIG. 6, then identical data extractor 15 puts the value of LBA2+P in LBA2 (step A6 in FIG. 6), and checks whether there are logical unit numbers LUN=LUN2 and LBA=LBA2 or not (step A7 in FIG. 6).

If there are logical unit numbers LUN=LUN2 and LBA=LBA2, then identical data extractor 15 goes back to step A2. If there are no logical unit numbers LUN=LUN2 and LBA=LBA2, then identical data extractor 15 sets LBA2=0 (step A8 in FIG. 6), and puts LUN2+1 in LUN2 (step A9 in FIG. 6).

Then, identical data extractor 15 checks whether there is a logical unit number LUN=LUN2 (step A10 in FIG. 7). If there is LUN=LUN2, then identical data extractor 15 goes back to step A2. If there is no logical unit number LUN=LUN2, then identical data extractor 15 sets LUN2=0 (step A11 in FIG. 7), and puts LBA1+1 in LBA1 (step A12 in FIG. 7).

Thereafter, identical data extractor 15 checks whether there are logical unit numbers LUN=LUN1 and LBA=LBA1 (step A13 in FIG. 7). If there are logical unit numbers LUN=LUN1 and LBA=LBA1, then identical data extractor 15 goes back to step A2. If there are no logical unit numbers LUN=LUN1 and LBA=LBA1, then identical data extractor 15 sets LBA1=0 (step A14 in FIG. 7), and puts LUN1+1 in LUN1 (step A15 in FIG. 7).

Then, identical data extractor 15 checks whether there is logical unit numbers LUN=LUN1 (step A16 in FIG. 7). If there is logical unit numbers LUN=LUN1, then identical data extractor 15 goes back to step A2. If there is no logical unit numbers LUN=LUN1, then identical data extractor 15 sets LUN1=0 (step A17 in FIG. 7), and then goes back to step A2.

Details of the identical data string information registering process will be described below with reference to FIGS. 8 and 9.

First, identical data extractor 15 calculates the hash value of LBA1 (step B1 in FIG. 8). Identical data extractor 15 follows a link from the columns having the calculated hash value among the columns of identical data string management table 1410 of identical data string information storage 141, looking for identical management record 1411 which corresponds to LUN1, LBA1 (step B2 in FIG. 8).

If identical management record 1411 which corresponds to LUN1, LBA1 has not been registered, then identical data extractor 15 generates identical management record 1411 which corresponds to LUN1, LBA1, and inserts generated identical management record 1411 into the final end of a list wherein the column having the hash value of identical data string management table 1410 serves as a head (step B3 in FIG. 8).

After step B3 or if identical management record 1411 which corresponds to LUN1, LBA1 has been registered (step B2, YES, in FIG. 8), then identical data extractor 15 calculates the hash value of LBA2 (step B4 in FIG. 8). Identical data extractor 15 follows a link from the columns having the calculated hash value among the columns of identical data string management table 1410 of identical data string information storage 141, looking for identical management record 1411 which corresponds to LUN2, LBA2 (step B5 in FIG. 8).

If identical management record 1411 which corresponds to LUN2, LBA2 has not been registered, then identical data extractor 15 generates identical management record 1411 which corresponds to LUN2, LBA2, and inserts generated identical management record 1411 into the final end of a list wherein the column having the hash value of identical data string management table 1410 serves as a head (step B6 in FIG. 8).

After step B6 or if identical management record 1411 which corresponds to LUN2, LBA2 has been registered (step B5, YES, in FIG. 8), then identical data extractor 15 checks whether or not identical management record 1411 corresponding to LUN1, LBA1 and identical management record 1411 corresponding to LUN2, LBA2 are mutually linked (B7 in FIG. 8).

If those identical management records 1411 are not mutually linked, then identical data extractor 15 mutually link identical management record 1411 corresponding to LUN1, LBA1 and identical management record 1411 corresponding to LUN2, LBA2 to each other (B8 in FIG. 8).

After step B8 or if identical management record 1411 corresponding to LUN1, LBA1 and identical management record 1411 corresponding to LUN2, LBA2 have been mutually linked (step B7, YES, in FIG. 8), then identical data extractor 15 performs the following process (step S9 in FIG. 9).

Identical data extractor 15 checks whether identical management record 1411 corresponding to LUN1, LBA1 is linked to other identical management records 1411 other than identical management record 1411 corresponding to LUN2, LBA2. If identical management record 1411 corresponding to LUN1, LBA1 is linked to other identical management records 1411, then identical data extractor 15 mutually links identical management record 1411 corresponding to LUN2, LBA2 to all linked identical management records 1411 other than identical management record 1411 corresponding to LUN2, LBA2 (step B9 in FIG. 9).

Thereafter, identical data extractor 15 checks if identical management record 1411 corresponding to LUN2, LBA2 is linked to identical management records 1411 other than identical management record 1411 corresponding to LUN1, LBA1 or not. If identical management record 1411 corresponding to LUN2, LBA2 is linked to identical management records 1411, other then identical data extractor 15 mutually links identical management record 1411 corresponding to LUN1, LBA1 to all linked identical management records 1411 other than identical management record 1411 corresponding to LUN1, LBA1 (step B10 in FIG. 9).

According to the present exemplary embodiment, identical data extractor 15 performs the processing of step B9 and the processing of step B10 to recognize identical data strings even if there are three or more addresses having such identical data strings.

According to the present exemplary embodiment, furthermore, the processing from steps A1 through A17 and the processing from steps B1 through B10 are repeated to store combinations of address information having identical data strings in identical data string information storage 141. According to the present exemplary embodiment, the contents of data are simply successively compared with each other to extract identical data strings. However, the pre-sent invention is not limited to such a process of extracting identical data strings, but may use other processes of extracting identical data strings. For example, the hash values of data strings are calculated in advance, and then compared with each other to narrow down data strings to be compared.

As identical data strings are successively extracted, combinations of all address information having identical data strings may not necessarily be registered in identical data string information storage 141. Although the present invention is more effective as more address information is registered, a smaller quantity of registered address information will not adversely affect the operation of the hierarchical storage control system to be described below.

When storage apparatus 1 receives a read command or a write command, identical data extractor 15 interrupts the processing from steps A1 through A17 and the processing from steps B1 through B10, and then performs a process based on the received command. After the process based on the received command is finished, identical data extractor 15 resumes the interrupted processings. However, when storage apparatus 1 receives a read command or a write command while identical data extractor 15 is executing steps A3 through A5, identical data extractor 15 performs a process based on the received command after it has judged that the data strings are not identical to each other (step A4, NO, in FIG. 6) or after it has executed step A5, in order to prevent the relationship between identical data strings from being lost.

A reading process according to the present exemplary embodiment will be described below with reference to FIGS. 10 through 14. First, an overall processing sequence of the reading process will be described below with reference to FIG. 10.

When cache controller 11 receives a read command from host 2, cache controller 11 performs the address record searching process for an LUN and an LBA that are included in the read command (step C1 in FIG. 10). Details of the address record searching process will be described later.

If there is corresponding address record 1401 (step C2, YES, in FIG. 10), then cache controller 11 uses the page of page pointer 1402 linked from corresponding address record 1401 as a corresponding page (step C3 in FIG. 10), and reads and sends data stored in the corresponding page in cache 12 to host 2 (step C9 in FIG. 10).

If there is no corresponding address record 1401 (step C2, NO, in FIG. 10), then cache controller 11 performs the unused page pointer acquiring process (step C4 in FIG. 10) to acquire page pointer 1402.

Then, cache controller 11 performs the identical management record searching process (step C5 in FIG. 10) to check whether there is a corresponding identical management record 1411 or not. Details of the unused page pointer acquiring process and the identical management record searching process will be described later.

If there is a corresponding identical management record 1411 in the identical management record searching process (step C6, YES, in FIG. 10), then cache controller 11 performs the identical management record linking process (step C7 in FIG. 10). Details of the identical management record linking process will be described later. After the identical management record linking process is executed or if there is no corresponding identical management record 1411 (step C6, NO, FIG. 10), then cache controller 11 reads data from HDD 16. Cache controller 11 then stores the data into a page corresponding to page pointer 1402 that is acquired in step C4 (step C8 in FIG. 10). Then, cache controller 11 reads and sends the data stored in the corresponding page in cache 12 to host 2 (step C9 in FIG. 10).

Details of the address record searching process (step C1) will be described below with reference to FIG. 11.

First, cache controller 11 calculates the hash value of an LBA included in the read command (step D1 in FIG. 11).

Then, cache controller 11 follows a link from the columns having the hash value among the columns of cache management table 1400, looking for address record 1401 which corresponds to the LUN and the LBA included in the read command (step D2 in FIG. 11). If cache controller 11 fails to find address record 1401 until the final end of the link, then cache controller 11 judges that there is no corresponding address record 1401.

Details of the unused page pointer acquiring process (step C4) will be described below with reference to FIG. 12. First, cache controller 11 checks if there is page pointer 1402 linked from unused page pointer head 1403 or not (step E1 in FIG. 12).

If there is no page pointer 1402, cache controller 11 performs a page opening process (step E2 in FIG. 12).

In the page opening process, cache controller 11 determines that page pointer 1402 is to be opened based on an LRU (Least Recent Used) algorithm.

According to the page opening process, if page pointer 1402 that is to be opened is clean, then cache controller 11 removes address record 1401 linked from page pointer 1402 that is to be opened from the link wherein a column of cache management table 1400 serves as a head. Then, cache controller 11 deletes all pointers of page pointer 1402, and connects page pointer 1402 to the final end of the link wherein unused page pointer head 1403 serves as a head. The phrase "page pointer 1402 to be opened is clean" means that the data written from host 2 into a page corresponding to page pointer 1402 of cache 12 do not include data that have not yet been written in HDD 16.

According to the page opening process, if page pointer 1402 that is to be opened is dirty, then cache controller 11 writes data in a page corresponding to page pointer 1402 into an LUN and an LBA of address record 1401 linked from page pointer 1402. Thereafter, cache controller 11 removes address record 1401 linked from page pointer 1402 from the link wherein a column of cache management table 1400 serves as a head. Then, cache controller 11 deletes all pointers of page pointer 1402, and connects page pointer 1402 to the final end of the link wherein unused page pointer head 1403 serves as a head. The phrase "page pointer 1402 to be opened is dirty" means that the data written from host 2 into a page corresponding to page pointer 1402 of cache 12 include data that have not yet been written in HDD 16. The page opening process is performed on one or more page pointers 1402.

After the page opening process is performed or if there is a page pointer 1402 linked from unused page pointer head 1403 (step E1, YES, in FIG. 12), then cache controller 11 acquires page pointer 1402 from the beginning of the link wherein unused page pointer head 1403 serves as a head (step E3 in FIG. 12).

Details of the identical management record searching process (step C5) will be described below with reference to FIG. 13.

First, cache controller 11 generates address record 1401 which corresponds to an LUN and an LBA included in the read command, and inserts generated address record 1401 into the final end of a link wherein the column having the hash value, calculated from the LBA, of cache management table 1400 serves as a head (step F1 in FIG. 13).

Then, cache controller 11 mutually links address record 1401 and page pointer 1402 acquired in the unused page pointer acquiring process (step C4) to each other (step F2 in FIG. 13).

Then, cache controller 11 follows a link from the columns having the hash value of identical data string management table 1410, checking whether or not there is an identical management record 1411 which corresponds to an LUN and an LBA of the command. If cache controller 11 fails to find corresponding identical management record 1411 until the final end of the link, then cache controller 11 judges that there is no corresponding identical management record 1411 (step F3 in FIG. 13).

Details of the identical management record linking process (step C7) will be described below with reference to FIG. 14.

First, cache controller 11 generates address records 1401 with respect to LUNs and LBAs of all identical management records 1411 linked from identical management record 1411 found in the identical management record searching process (step C6). Then, cache controller 11 inserts address records 1401 into the final end of a list wherein a column of cache management table 1400 which has the hash value calculated from the LBAs of all identical management records 1411 of those address records 1401 (step G1 in FIG. 14).

However, if there is an address record 1401 having a corresponding LUN and LBA on the link, then cache controller 11 performs the page opening process on the page of page pointer 1402 linked from address record 14401, and thereafter inserts generated address records 1401.

Subsequently, cache controller 11 mutually links all address records 1401 inserted in step G1 and page pointer 1402 acquired in step C4 to each other (step G2 in FIG. 14).

A writing process according to the present exemplary embodiment will be described below with reference to FIGS. 15, 11, and 12.

When cache controller 11 receives a write command from host 2, cache controller 11 performs an address record searching process corresponding to an LUN and an LBA included in the write command (step H1 in FIG. 15). The address record searching process is the same as the address record searching process (step C1) shown in FIG. 10.

If there is a corresponding address record 1401 (step H2, YES, in FIG. 15), then cache controller 11 uses the page of page pointer 1402 linked from corresponding address record 1401 as a corresponding page (step H3 in FIG. 15).

Then, if there are two or more links from page pointer 1402 to address record 1401 (step H4, YES, in FIG. 15), then cache controller 11 deletes address records 1401 other than the address for which the write command issued, from address records 1401 (step H5 in FIG. 15).

After cache controller 11 deletes address records 1401 other than the address for which the write command is issued or if there are not two or more links from page pointer 1402 to address record 1401 (step H4, NO, in FIG. 15), then cache controller 11 follows a link from the columns of identical data string management table 1410 which have the hash value calculated from the LBA of the write command, looking for identical management record 1411 which corresponds to the LUN and the LBA of the write command (step H6 in FIG. 15).

If there is an identical management record 1411 which corresponds to the address of the write command (step H7, YES, in FIG. 15), then cache controller 11 deletes identical management record 1411 and all identical management records 1411 linked to identical management record 1411 (step H8 in FIG. 15).

The processing from step H5 to step S8 serves to reflect that areas storing identical data strings are no longer areas storing identical data strings because data are written in only one area.

After cache controller 11 deletes identical management records 1411 or if there is no identical management record 1411 (step H7, NO, in FIG. 15), then cache controller 11 receives write data from host 2 and stores the write data into a page corresponding to page pointer 1402 of cache 12 (step H9 in FIG. 15).

If there is no corresponding address record 1401 (step H2, NO, in FIG. 15), then cache controller 11 performs an unused page pointer acquiring process (step H10 in FIG. 15). The unused page pointer acquiring process is the same as the unused page pointer acquiring process (step C4) shown in FIG. 10.

Then, cache controller 11 generates address record 1401 which corresponds to an LUN and an LBA included in the write command, and inserts generated address record 1401 into the final end of a link wherein the column having the hash value, calculated from the LBA, of cache management table 1400 serves as a head (step H11 in FIG. 15).

Cache controller 11 mutually links address record 1401 and page pointer 1402 acquired in the unused page pointer acquiring process (step H10) to each other (step H12 in FIG. 15). Thereafter, cache controller 11 performs the processing from step H6.

According to the present exemplary embodiment, since the storage areas of HDD 16 which have identical data strings use the same page of cache 12, the utilization efficiency of cache 12 is higher than if a page of cache 12 is associated with only one storage area of HDD 16.

According to the present exemplary embodiment, furthermore, since storage areas of HDD 16 store a plurality of identical data strings, a data loss caused when part of HDD 16 suffers a fault is less significant than in the case of with the duplication technology wherein a storage area of HDD 16 stores only one identical data string.

According to the present exemplary embodiment, moreover, the process for looking for identical data strings is performed independently of the process for processing commands, and hence there is no need to compare data strings each time a write command is generated. Therefore, the time to respond to commands is not greatly affected.

A second exemplary embodiment of the present invention will be described below with reference to the drawings.

The second exemplary embodiment is different from the first exemplary embodiment as regards the processing of a write command. Specifically, according to the second exemplary embodiment, when cache controller 11 receives a write command from hosts 2-1 through 2-3 for writing data in either one of a plurality of storage areas of HDDs 16-1 through 16-4 that are associated with the storage areas of cache 11, cache controller 11 cancels the association of the storage area.

Other processing and structural details of the second exemplary embodiment are identical to those of the first exemplary embodiment.

Figure 16:
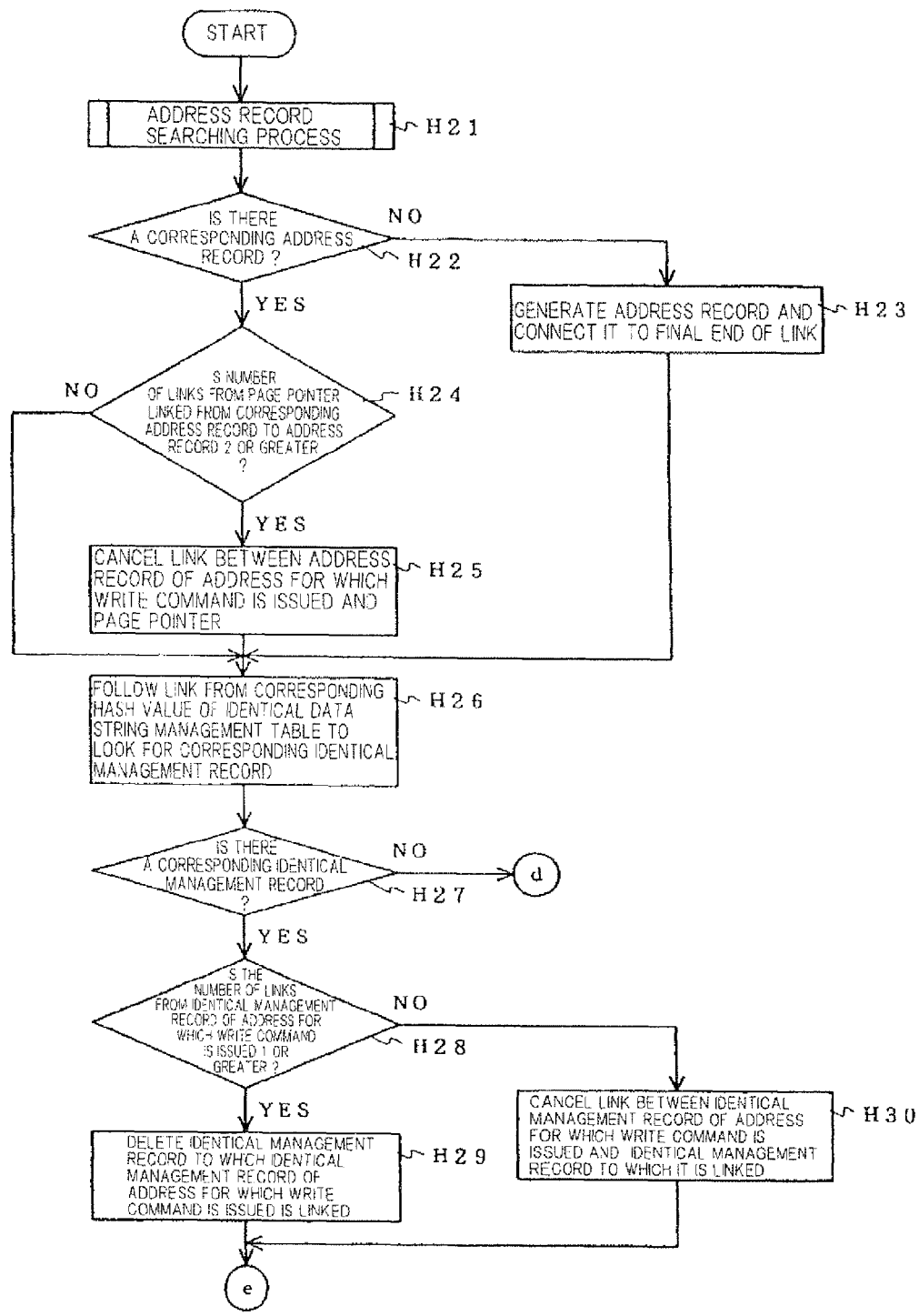
FIG. 16 is a flowchart of a writing process according to a second exemplary embodiment of the present invention.
Figure 17:
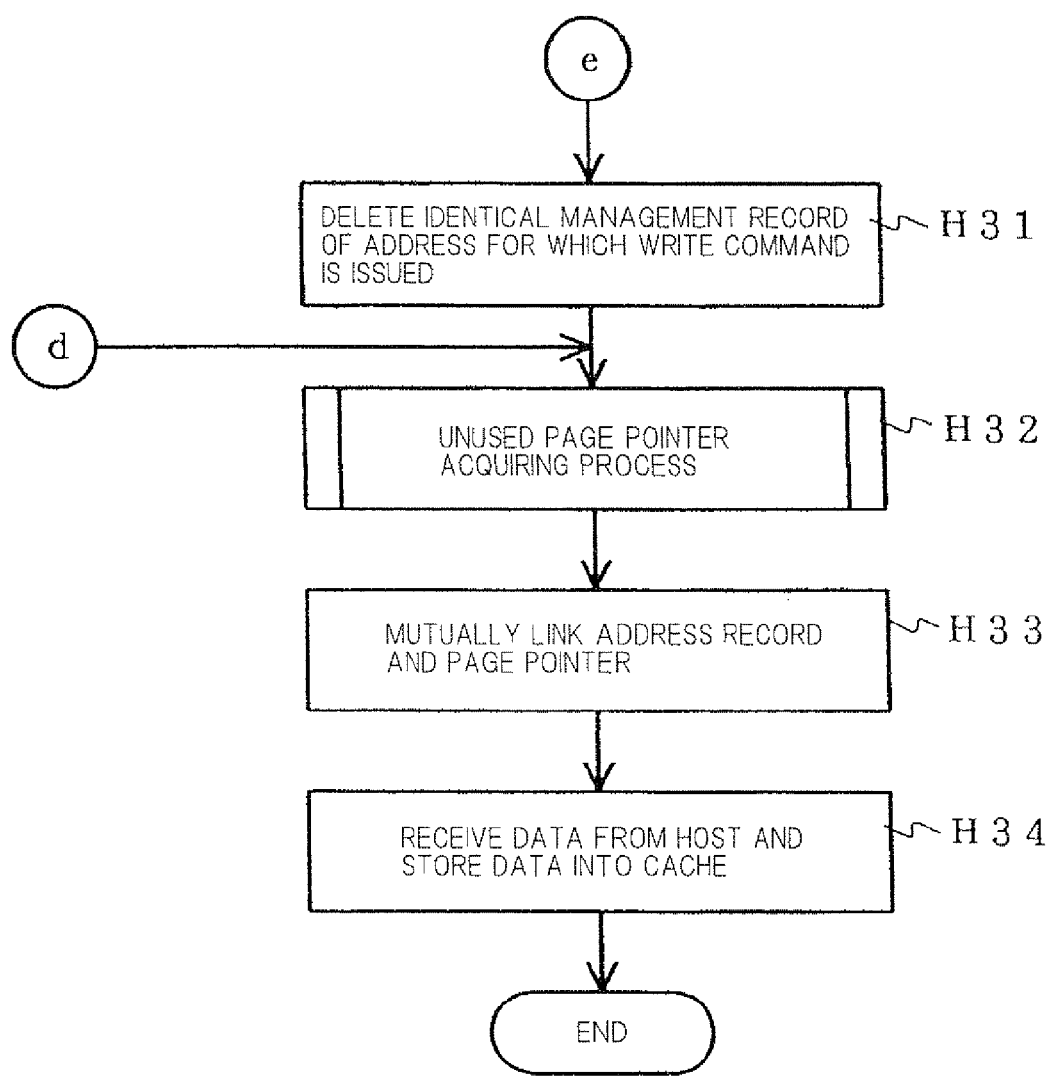
FIG. 17 is a flowchart of the writing process according to the second exemplary embodiment of the present invention.

FIGS. 16 and 17 are a flowchart of a writing process according to the second exemplary embodiment. The writing process according to the second exemplary embodiment will be described below with reference to FIGS. 16 and 17 as well as FIGS. 11 and 12. The processing sequences shown in FIGS. 16 and 17 can be implemented by having a computer, not shown, such as a CPU or the like in storage apparatus 1 execute corresponding programs.

When cache controller 11 receives a write command from host 2, cache controller 11 performs an address record searching process corresponding to an LUN and an LBA included in the write command (step H21 in FIG. 16). The address record searching process is the same as the address record searching process (step C1) shown in FIG. 10.

If there is a corresponding address record 1401 (step H22, YES, in FIG. 16), then cache controller 11 checks whether or not there are two or more links from page pointer 1402 linked from corresponding address record 1401 to address record 1401 (step H24 in FIG. 16).

If there are two or more links, then cache controller 11 cancels the mutual link between address record 1401 corresponding to the LUN and the LBA of the write command and page pointer 1402 (step H25 in FIG. 16).

If there is no corresponding address record 1401 (step H22, NO, in FIG. 16), then cache controller 11 generates corresponding address record 1401 and inserts generated address record 1401 into the final end of a link wherein the column having the hash value, calculated from the LBA of the write command, of cache management table 1400, serves as a head (step H23 in FIG. 16).

After the mutual link between address record 1401 and page pointer 1402 is canceled (step S25 in FIG. 16), or if there is one link to corresponding address record 1401 (step H24, NO, in FIG. 16), or after address record 1401 is generated (step S23 in FIG. 16), cache controller 11 follows a link from the columns of identical data string management table 1410 which have the hash value calculated from the LBA of the write command, looking for identical management record 1411 which corresponds to the address of the write command (step H26 in FIG. 16).

If there is a corresponding identical management record 1411 (step H27, YES, in FIG. 16), then cache controller 11 checks whether or not the number of links from corresponding identical management record 1411 is 1 or not (step H28 in FIG. 16). If the number of links is 1, then cache controller 11 deletes an identical management record to which identical management record 1411 corresponding to the address of the write command is linked (step H29 in FIG. 16).

If the number of links is not 1, but 2 or greater, then cache controller 11 cancels the link between identical management record 1411 corresponding to the address of the write command and identical management record 1411 to which it is linked (step H30 in FIG. 16).

After the identical management record to which identical management record 1411 corresponding to the address of the write command is linked is deleted (step H29 in FIG. 16) or after the link between identical management record 1411 corresponding to the address of the write command and identical management record 1411 to which it is linked is canceled (step H30 in FIG. 16), cache controller 11 deletes identical management record 1411 corresponding to the address of the write command (step H31 in FIG. 17).

If there is no corresponding identical management record 1411 (step H27, NO, in FIG. 16) or after the identical management record 1411 corresponding to the address of the write command is deleted (step H31 in FIG. 17), cache controller 11 performs an unused page pointer acquiring process (step H32 in FIG. 17). The unused page pointer acquiring process is the same as the unused page pointer acquiring process (step C4) shown in FIG. 10.

Cache controller 11 mutually links address record 1401 corresponding to the address of the write command and page pointer 1402 acquired in step H32 to each other (step H33 in FIG. 17). Thereafter, cache controller 11 receives data from host 2 and stores the data into a page corresponding to page pointer 1402 of cache 12 (step H34 in FIG. 17).

As described above, the second exemplary embodiment offers advantages, in addition to the advantages according to the first exemplary embodiment, in that when cache 12 has pages corresponding to a plurality of addresses, if there is issued a write command for one of the corresponding addresses, then since data other than the data in the address for which the write command is issued remain in cache 12, it is not necessary to keep a new cache page or to read data from HDD 16 into cache 12 when there is access to addresses other than the data in the address for which the write command is issued.

The best mode of operation of the hierarchical storage control apparatus will be described below with respect to specific examples of the present invention. A first example of the present invention corresponds to the first exemplary embodiment of the present invention. Values of LBA which are indicated with a suffix of "h" represent a hexadecimal notation.

FIGS. 18a, 18b, 19a, and 19b show the concept of storage spaces of cache 12 and HDD 16 according to the first example of the present invention. FIGS. 20a through 20d and FIGS. 21a through 21c show states of cache management information storage 140 according to the first example of the present invention.

Address records 1401 shown in FIGS. 20b through 20d have corresponding LUNs, LBAs indicated by a format (LUN, LBA). Page pointers 1402 shown in FIGS. 20b through 20d and FIGS. 17a through 17c have corresponding numbers of pages indicated by a format (page number).

FIGS. 22a through 22d show states of identical data string information storage 141 according to the first example of the present invention. Identical data string information storage 141 shown in FIGS. 22a through 22d have corresponding LUNs, LBAs indicated by a format (LUN, LBA).

According to the present example, it is assumed that cache 12 has eight pages having respective page numbers from 0 to 7. The storage space of HDD 16 is assigned two LUNs, i.e., LUN=0 and LUN=1. Block LUN=0 has an address space represented by LBA=0h through 3FFFh, and block LUN=1 has an address space represented by LBA=0h through 4FFFh.

Figure 18A:
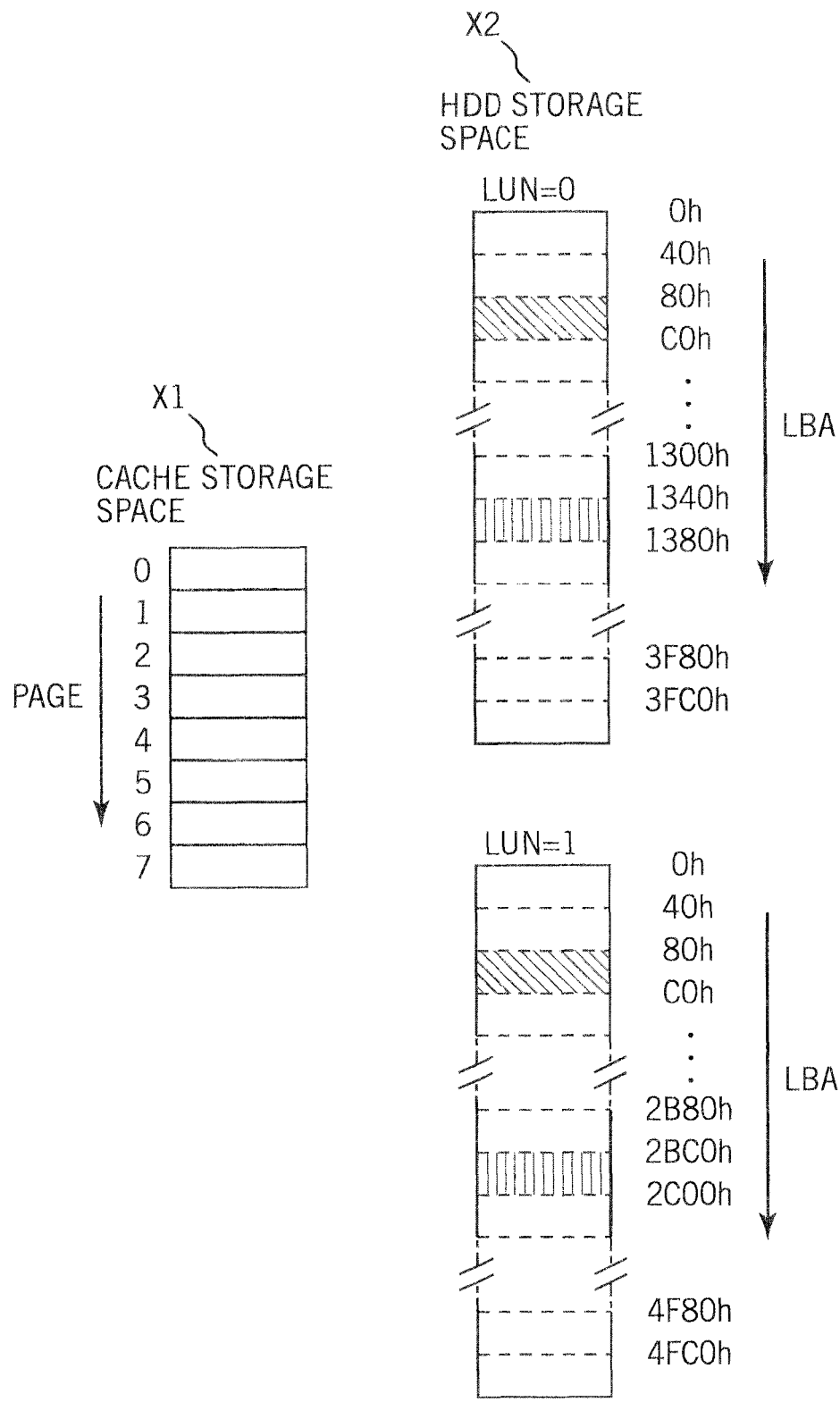
FIG. 18a is a diagram showing the concept of an example of a storage space according to a first example of the present invention.

First, it is assumed that an address space represented by LBA=80h through BFh of block LUN=0 and an address space represented by LBA=80h through BFh of block LUN=1, and an address space represented by LBA=1340h through 137Fh of block LUN=0 and an address space represented by LBA=2BC0h through 2BFFh of block LUN=1 store identical data strings. The concept of storage space X1 of cache 12 and the storage space X2 of HDD 16 at this time is illustrated in FIG. 18a.

Figure 21A:
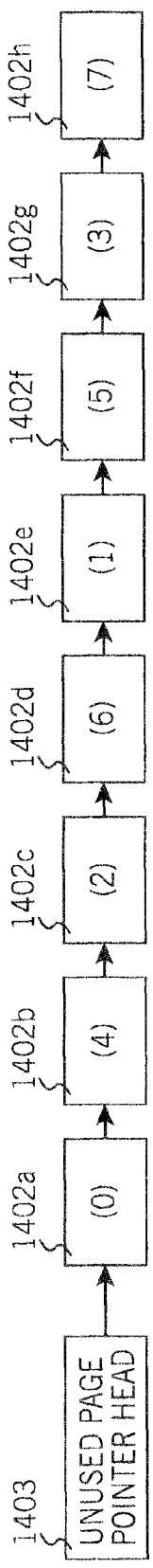
FIG. 21a is a diagram showing a further example of the data structure of cache management information storage unit according to the first example of the present invention.
Figure 21B:
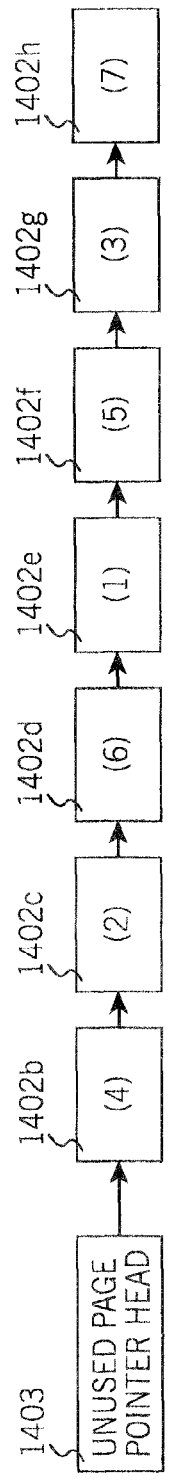
FIG. 21b is a diagram showing a still further example of the data structure of cache management information storage unit according to the first example of the present invention.
Figure 21C:
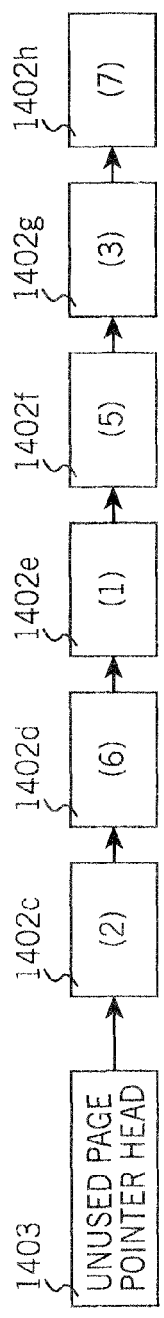
FIG. 21c is a diagram showing a yet further example of the data structure of cache management information storage unit according to the first example of the present invention.

It is also assumed that no address record 1401 is linked to cache management table 1400. The state of cache management information storage 140 at this time is illustrated in FIGS. 20a and 21a.

Figure 22A:
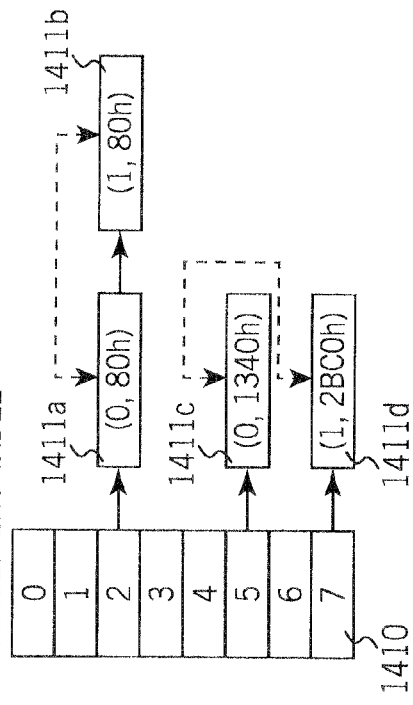
FIG. 22a is a diagram showing a data structure of an identical data string information storage unit according to the first example of the present invention.

It is also assumed that no identical management record 1411 is linked to identical data string management table 1410. The state of identical data string information storage 141 at this time is illustrated in FIG. 22a.

If there is no command from host 2, then the steps shown in FIGS. 6 and 7 are repeatedly carried out. It is determined that the data string stored in the address space represented by LBA=80h through BFh of block LUN=0 and the data string stored in the address space represented by LBA=80h through BFFh of block LUN=1 are identical to each other (steps A3, A4 in FIG. 6), after which the identical data string information registering process (step A5 in FIG. 6) is performed to bring identical data string management table 1410 into the state shown in FIG. 22b.

Figure 22C:
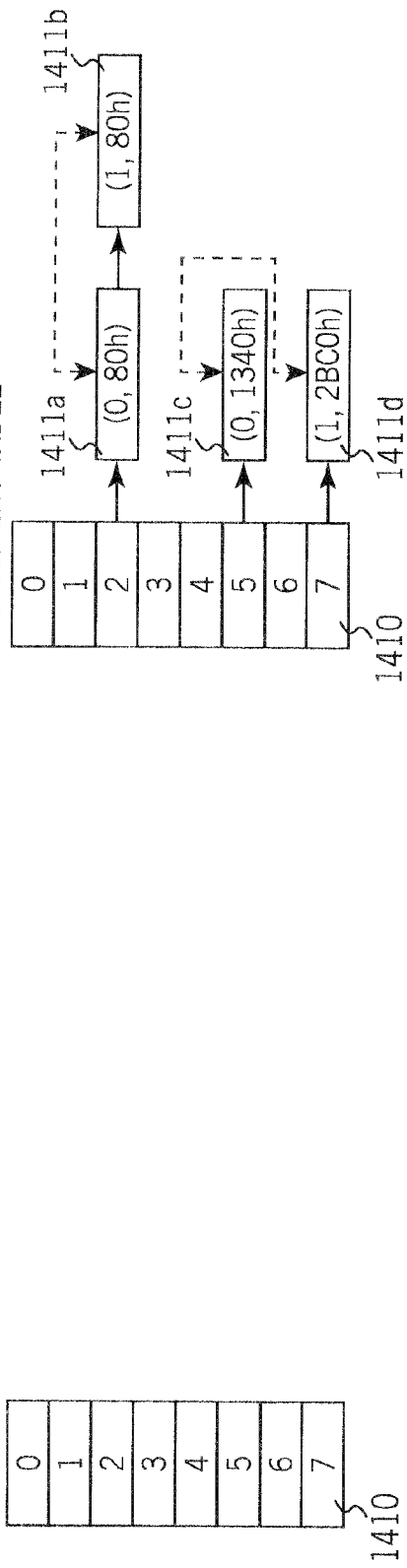
FIG. 22c is a diagram showing a data structure of the identical data string information storage unit according to the first example of the present invention.
Figure 22B:
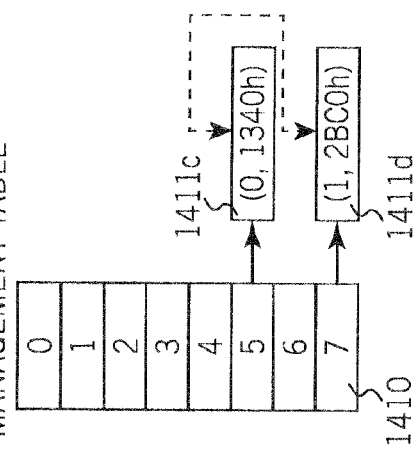
FIG. 22b is a diagram showing a data structure of the identical data string information storage unit according to the first example of the present invention.

It is then determined that the data string stored in the address space represented by LBA=1340h through 137Fh of block LUN=0 and an address space represented by LBA=2BC0h through 2BFFh of block LUN=1 and the data string stored in the address space represented by LBA=2BC0h through 2BFFh of block LUN=1 are identical to each other (steps A3, A4 in FIG. 6), after which the identical data string information registering process (step A5 in FIG. 6) is performed to bring identical data string management table 1410 into the state shown in FIG. 22c.

Figure 18B:
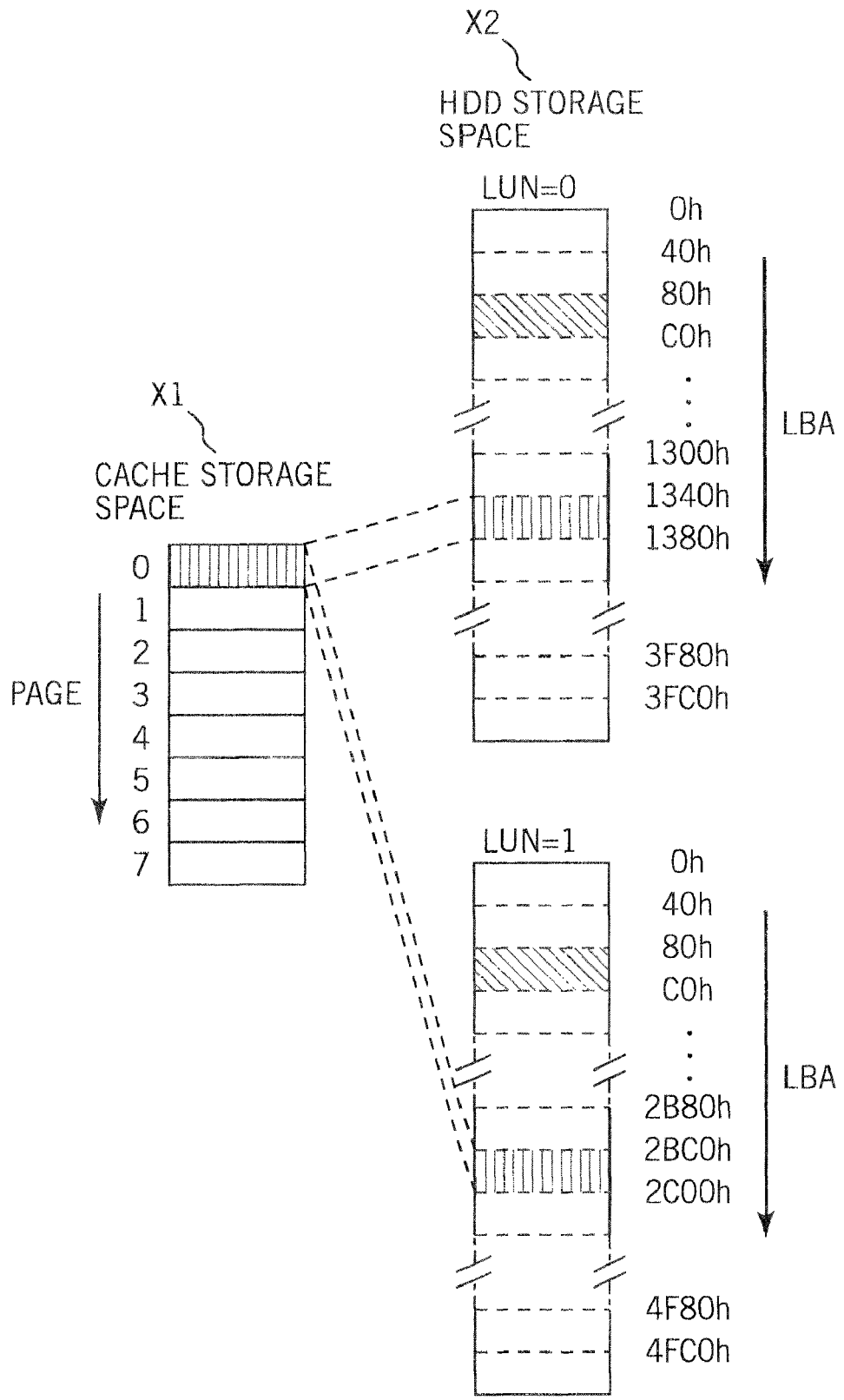
FIG. 18b is a diagram showing the concept of another example of the storage space according to the first example of the present invention.

It is assumed that a read command for reading 32 kilobytes of data from block LUN=0 at address LBA=1340h is received from host 2. At this time, the steps shown in FIG. 10 are carried out. Cache management information storage 140 is now in the states shown in FIGS. 20b and 21b. The concept of an association between storage space X1 of cache 12 and storage space X2 of HDD 16 is illustrated in FIG. 18b. Identical data string management table 1410 remains in the state shown in FIG. 22c.

The data string stored in the address space represented by LBA=1340h through 137Fh of block LUN=0 is read into the page indicated by page number=0 of cache 12. This data string is identical to the data string stored in the storage space represented by LBA=2BC0h through 2BFFh of block LUN=1.

Figure 19A:
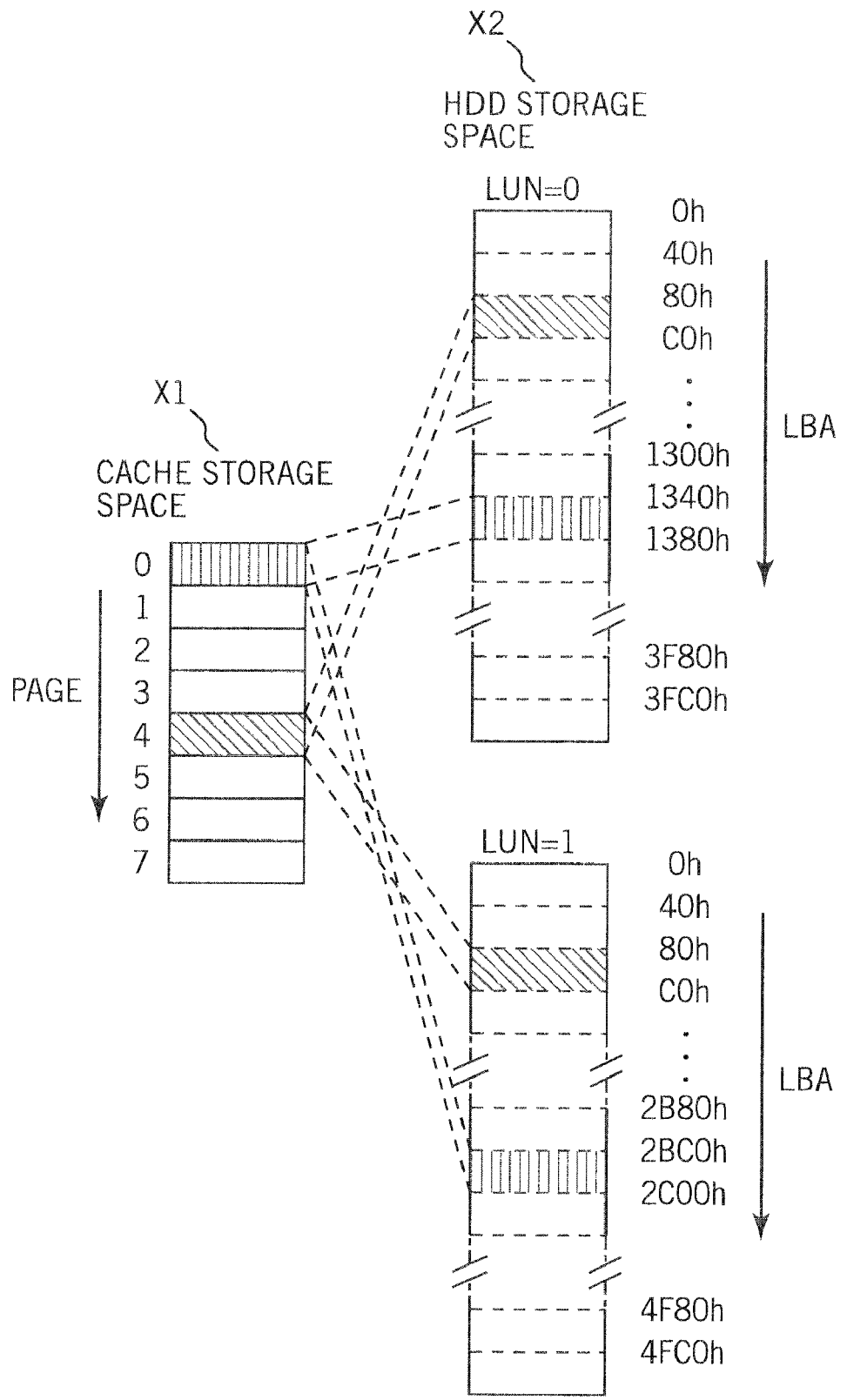
FIG. 19a is a diagram showing the concept of the storage space according to the first example of the present invention.

Then, it is assumed that a read command for reading 32 kilobytes of data from block LUN=1 at address LBA=80h is received from host 2. At this time, the steps shown in FIG. 10 are carried out. Cache management information storage 140 is now in the states shown in FIGS. 20c and 21c. The concept of an association between storage space X1 of cache 12 and storage space X2 of HDD 16 is illustrated in FIG. 19a.

Identical data string management table 1410 remains in the state shown in FIG. 22c. The data string stored in the address space represented by LBA=80h through BFh of block LUN=1 is read into the page indicated by page number=4 of cache 12. This read data string is identical to the data string stored in the storage space represented by LBA=80h through BFh of block LUN=0.

Then, it is assumed that a read command for reading 32 kilobytes of data from block LUN=1 at address LBA=2BC0h is received from host 2. At this time, the steps shown in FIG. 10 are carried out. Cache management information storage 140 remains in the states shown in FIGS. 20c and 21c. The concept of an association between storage space X1 of cache 12 and storage space X2 of HDD 16 at this time remains in the state illustrated in FIG. 19a. In other words, no new page is used in cache 12. Identical data string management table 1410 remains in the state shown in FIG. 22c.

Then, it is assumed that a read command for reading 32 kilobytes of data from block LUN=0 at address LBA=80h is received from host 2. At this time, the steps shown in FIG. 10 are carried out. Cache management information storage 140 remains in the states shown in FIGS. 20c and 21c. The concept of an association between storage space X1 of cache 12 and storage space X2 of HDD 16 at this time remains in the state illustrated in FIG. 19a. In other words, no new page is used in cache 12. Identical data string management table 1410 remains in the state shown in FIG. 22c.

Figure 19B:
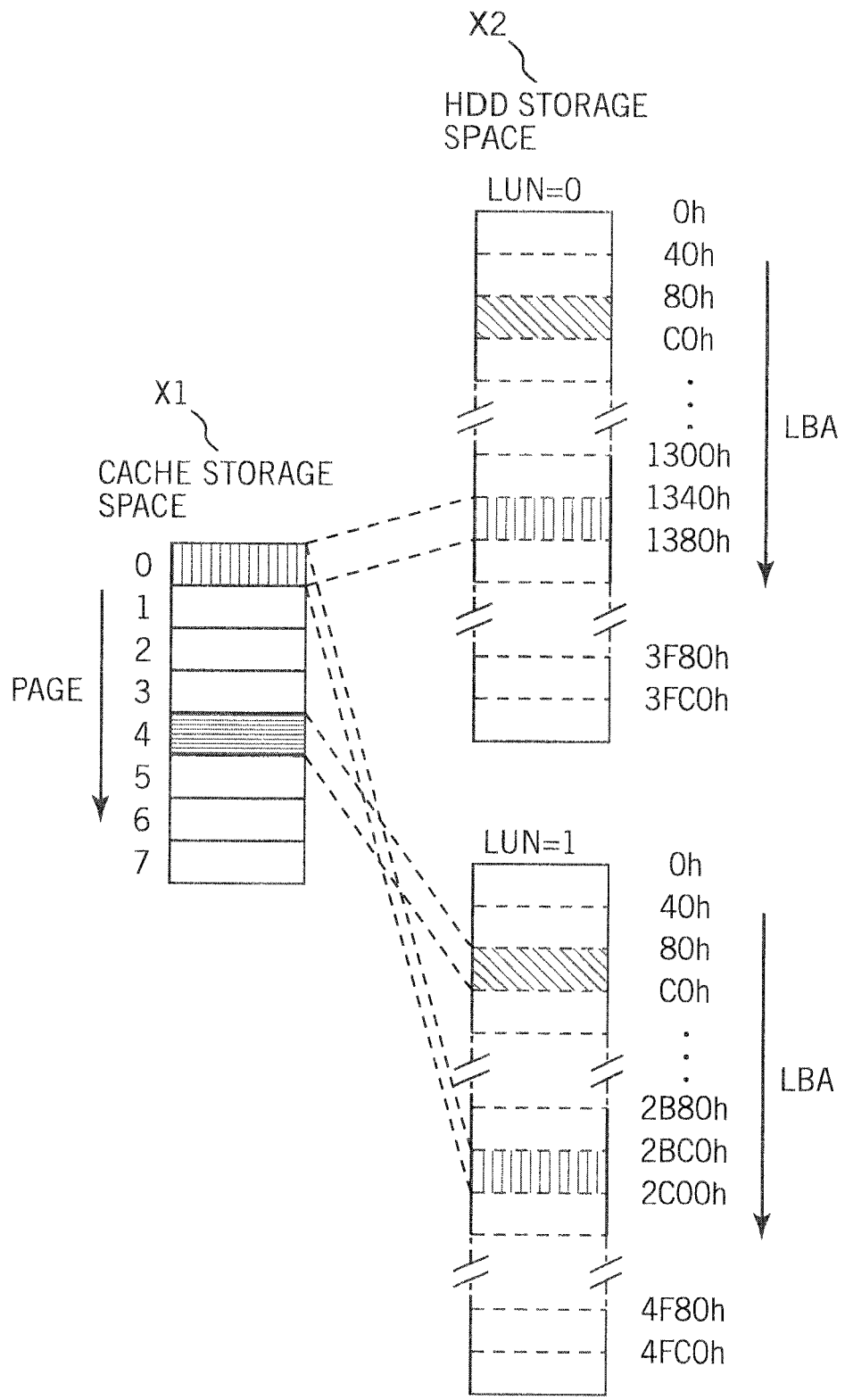
FIG. 19b is a diagram showing the concept of the storage space according to the first example of the present invention.

Then, it is assumed that a write command for writing 32 kilobytes of data into block LUN=1 at address LBA=80h is received from host 2. At this time, the steps shown in FIG. 15 are carried out. Cache management information storage 140 is brought into the states shown in FIGS. 20d and 21c. The concept of an association between storage space X1 of cache 12 and storage space X2 of HDD 16 at this time is illustrated in FIG. 19b.

Figure 22D:
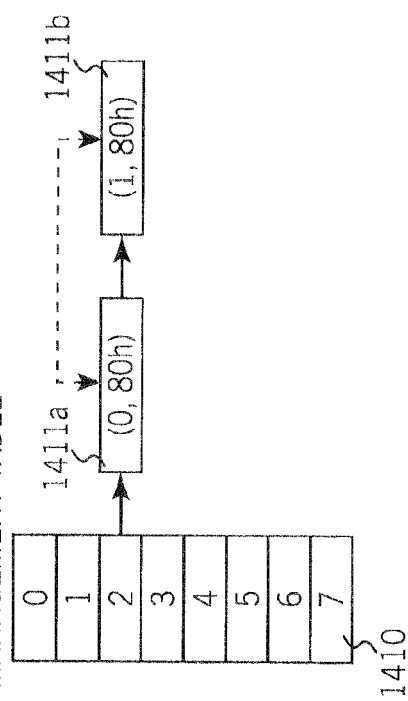
FIG. 22d is a diagram showing a data structure of the identical data string information storage unit according to the first example of the present invention.

Identical data string management table 1410 is brought into the state shown in FIG. 22d. At this time, the data written into block LUN=1 at address LBA=80h are stored only in the page represented by page number=4 of cache 12. Actually, the data will subsequently be stored into block LUN=0 at address LBA=80h of HDD 16. Specifically, the data will be stored when the page opening process is performed on the page represented by page number=4 of cache 12.

According to the present exemplary embodiment, access is gained to four areas, i.e., the address space represented by LBA=80h through BFh of block LUN=0, the address space represented by LBA=1340h through 137Fh of block LUN=0, the address space represented by LBA=80h through BFh of block LUN=1, and the address space represented by LBA=2BC0h through 2BFFh of block LUN=1. The number of pages of cache 12 used at this time is only 2. According to the technology for associating one page of cache 12 with only one storage areas of HDD 16, the number of pages used is 4. Therefore, it can be seen that the cache utilization efficiency is increased according to the present invention.

A second example of the present invention, which corresponds to the second exemplary embodiment of the present invention, will be described below. In order to point out the difference between the first exemplary embodiment and the second exemplary embodiment, it is assumed according to the second example that the same arrangement as with the first example is employed to receive the same commands from host 2.

Specifically, it is assumed that a read command for reading 32 kilobytes of data from block LUN=0 at address LBA=1340h, a read command for reading 32 kilobytes of data from block LUN=1 at address LBA=80h, a read command for reading 32 kilobytes of data from block LUN=1 at address LBA=2BC0h, and a read command for reading 32 kilobytes of data from block LUN=0 at address LBA=80h are successively received from host 2.

The operation up to this point is the same as with the first example described above. At this time, cache management information storage 140 is in the states shown in FIGS. 20c and 21c. The concept of an association between storage space X1 of cache 12 and storage space X2 of HDD 16 is illustrated in FIG. 19a. Identical data string management table 1410 remains in the state shown in FIG. 22c.

Figure 24:
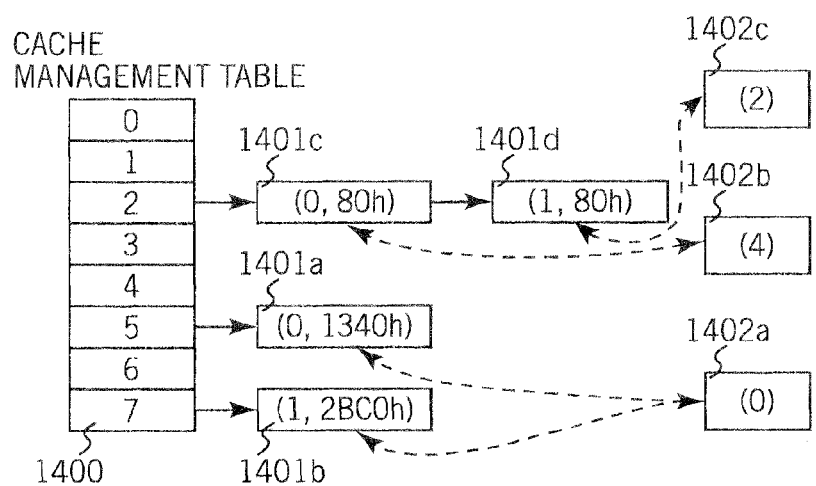
FIG. 24 is a diagram showing a portion of a data structure of a cache management information storage unit according to the second example of the present invention.
Figure 25:
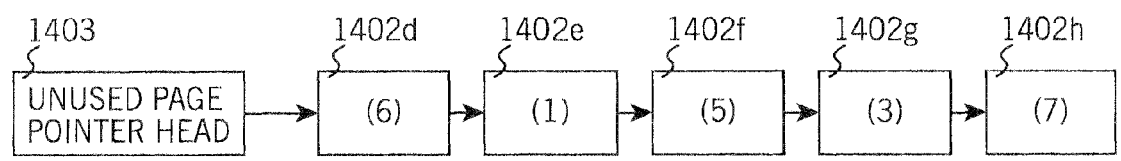
FIG. 25 is a diagram showing a portion of the data structure of cache management information storage unit according to the second example of the present invention.

Then, it is assumed that a write command for writing 32 kilobytes of data into block LUN=1 at address LBA=80h is received from host 2. At this time, the steps shown in FIGS. 16 and 17 are carried out. Cache management information storage 140 is brought into the states shown in FIGS. 24 and 25. The concept of an association between storage space X1 of cache 12 and storage space X2 of HDD 16 at this time is illustrated in FIG. 23.

Identical data string management table 1410 is brought into the state shown in FIG. 22d. At this time, the data written into block LUN=1 at address LBA=80h are stored only in the page represented by page number=4 of cache 12. Actually, the data will subsequently be stored into block LUN=0 at address LBA=80h of HDD 16. Specifically, the data will be stored when the page opening process is performed on the page represented by page number=2 of cache 12.

Figure 23:
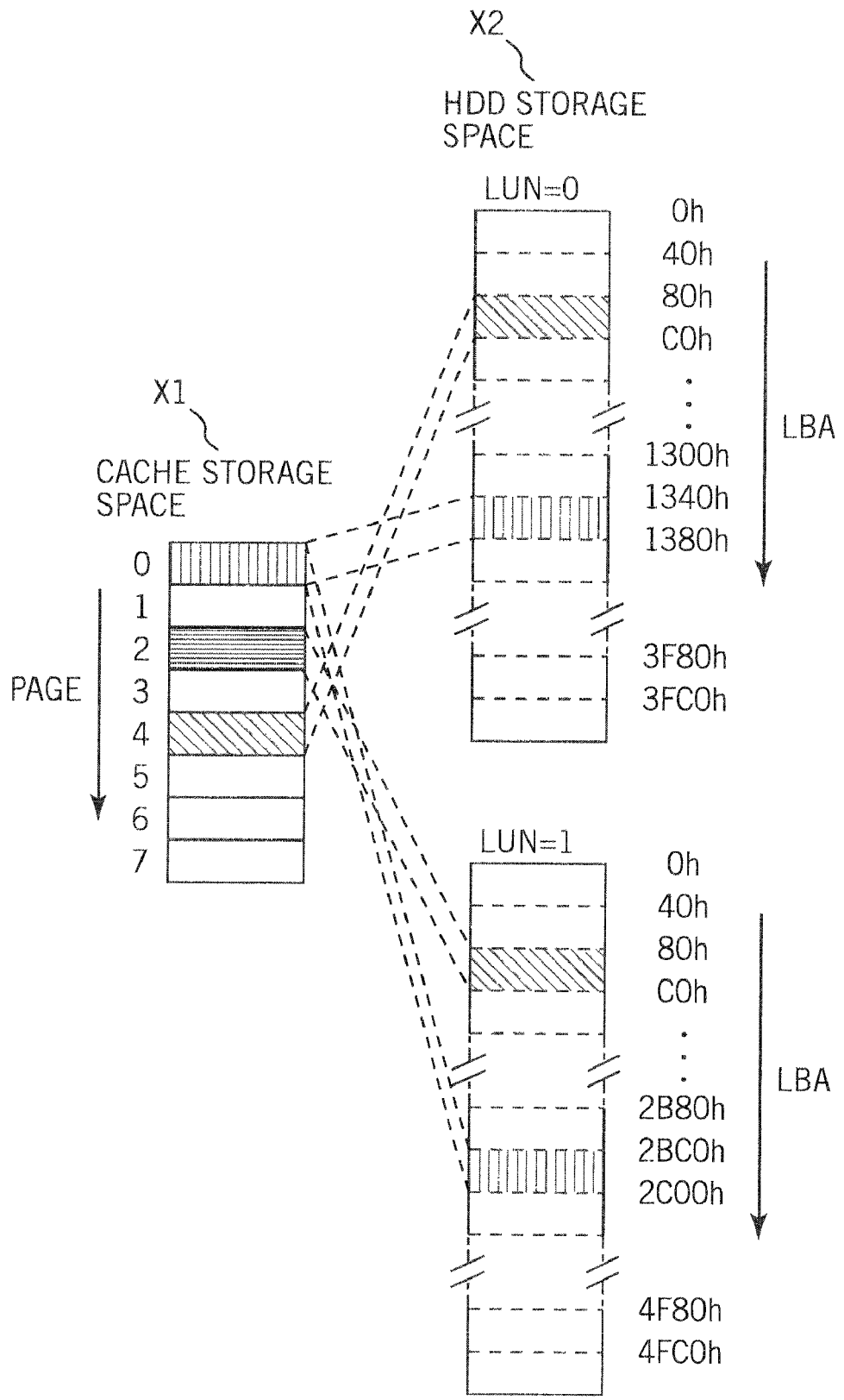
FIG. 23 is a diagram showing the concept of a storage space according to a second example of the present invention.

A comparison between FIG. 19b illustrating the first example and FIG. 23 illustrating the second example indicates that whereas the data in block LUN=0 at address LBA=80h are deleted from cache 12 according to the first example, the data in block LUN=0 at address LBA=80h remain in the page of cache 12. Therefore, even if block LUN=0 at address LBA=80h is subsequently accessed, it is not necessary to keep a page of cache 12 and to read the data from HDD 16.

According to the present invention, as described above, storage apparatus 1 includes identical data string extractor 15, a layer storage controller (cache controller 11), identical data string information storage 141, and a layer storage management information storage unit (cache management information storage 140). Identical data string extractor 15 extracts a storage area having an identical data string from the lower storage layer, and stores area information in identical data string information storage 141. Based on the information stored in identical data string information storage 141, the layer storage controller (cache controller 11) associates a plurality of storage areas of the lower storage layer with one storage area of the upper storage layer, and stores associative information in the layer storage management information storage unit (cache management information storage 140).

According to the present invention thus configured, since the storage areas of the lower storage layer which store identical data strings are associated with the single storage area of the upper storage layer, the upper storage layer is prevented from storing a plurality of identical data strings and hence has increased utilization efficiency in a hierarchical data storage configuration. The increased utilization efficiency is achieved by associating one storage area of the upper storage layer with a plurality of storage areas of the lower storage layer which store identical data strings.

The hierarchical storage control system according to the present invention is applicable to storage apparatus having a cache, computer systems incorporating a hierarchical data storage configuration, and cache servers on networks.

While preferred embodiments of the present invention have been described using specific terms, such description is for illustrative purposes only, and it is to be understood that changes and variations may be made without departing from the spirit or scope of the following claims.

What is claimed is:

1. A hierarchical storage control apparatus for controlling a storage apparatus having an upper storage layer and a lower storage layer, comprising:
    an extractor that extracts a plurality of storage areas storing identical data strings therein from said lower storage layer; and
    a layer storage controller that associates the storage areas extracted by said extractor with a single storage area of said upper storage layer,
    wherein said layer storage controller cancels an association between the storage area of said upper storage layer and the storage areas of said lower storage layer when said hierarchical storage control apparatus receives a write command for writing data into either one of the associated storage areas of said lower storage layer from a main apparatus.

2. The hierarchical storage control apparatus according to claim 1, further comprising:
    an identical data string information storage unit that stores identification information for identifying the storage areas extracted by said extractor;
    wherein said layer storage controller associates said storage areas with said single storage area of said upper storage layer based on the identification information stored in said data string information storage.

3. The hierarchical storage control apparatus according to claim 1, further comprising:
    a layer storage management information storage unit that stores management information representing an association made by said layer storage controller between the storage area of said upper storage layer and the storage areas of said lower storage layer.

4. The hierarchical storage control apparatus according to claim 1, wherein said upper storage layer comprises a cache memory, and said lower storage layer comprises a hard disk drive.

5. A storage apparatus comprising:
    a hierarchical storage control apparatus according to claim 1; said upper storage layer; and said lower storage layer.

6. A computer system comprising:
    a hierarchical storage control apparatus according to claim 1;
    said upper storage layer;
    said lower storage layer; and
    a main apparatus for sending said write command.

7. A method of controlling a storage apparatus having an upper storage layer and a lower storage layer, comprising:
    extracting a plurality of storage areas storing identical data strings therein from storage areas of said lower storage layer;
    associating the extracted storage areas with a single storage area of said upper storage layer; and
    canceling an association between the storage area of said upper storage layer and the storage areas of said lower storage layer when a write command for writing data into either one of the associated storage areas of said lower storage layer is received.

8. The method according to claim 7, wherein said upper storage layer comprises a cache memory, and said lower storage layer comprises a hard disk drive.

9. A non-transitory computer readable recording medium having recorded thereon a program for enabling a computer which is connected to a storage apparatus having an upper storage layer and a lower storage layer to perform a method of:
    extracting a plurality of storage areas storing identical data strings therein from storage areas of said lower storage layer;
    associating the extracted storage areas with a single storage area of said upper storage layer; and
    canceling an association between the storage area of said upper storage layer and the storage areas of said lower storage layer when a write command for writing data into either one of the associated storage areas of said lower storage layer is received.

10. The non-transitory computer readable recording medium according to claim 9, wherein said upper storage layer comprises a cache memory, and said lower storage layer comprises a hard disk drive.

* * * * *